(12) United States Patent
Jindal et al.

(10) Patent No.: US 9,549,317 B2
(45) Date of Patent: Jan. 17, 2017

(54) METHODS AND APPARATUSES TO PROVIDE SECURE COMMUNICATION BETWEEN AN UNTRUSTED WIRELESS ACCESS NETWORK AND A TRUSTED CONTROLLED NETWORK

(75) Inventors: Tamanna Jindal, Bangalore (IN); Sashidhar Annaluru, Cupertino, CA (US); Mukesh Garg, Cupertino, CA (US)

(73) Assignee: Mitel Mobility Inc., Richardson, TX (US)

( * ) Notice: Subject to any disclaimer, the term of this patent is extended or adjusted under 35 U.S.C. 154(b) by 169 days.

(21) Appl. No.: 13/572,573

(22) Filed: Aug. 10, 2012

(65) Prior Publication Data

US 2013/0097674 A1 Apr. 18, 2013

Related U.S. Application Data

(63) Continuation-in-part of application No. 13/326,191, filed on Dec. 14, 2011.

(60) Provisional application No. 61/627,792, filed on Oct. 17, 2011.

(51) Int. Cl.
*H04L 29/06* (2006.01)
*H04W 12/06* (2009.01)

(52) U.S. Cl.
CPC .......... *H04W 12/06* (2013.01); *H04L 63/0876* (2013.01); *H04L 63/0892* (2013.01)

(58) Field of Classification Search
None
See application file for complete search history.

(56) References Cited

U.S. PATENT DOCUMENTS

| | | | |
|---|---|---|---|
| 6,263,369 B1* | 7/2001 | Sitaraman et al. | 709/225 |
| 7,042,988 B2 | 5/2006 | Juitt et al. | |
| 7,693,507 B2* | 4/2010 | Suzuki et al. | 455/411 |
| 8,555,350 B1* | 10/2013 | Shatzkamer | H04L 67/1027 370/229 |
| 2005/0021979 A1* | 1/2005 | Wiedmann et al. | 713/182 |
| 2005/0030945 A1* | 2/2005 | Sarikaya et al. | 370/389 |
| 2006/0248229 A1* | 11/2006 | Saunderson et al. | 709/245 |
| 2007/0214270 A1* | 9/2007 | Absillis | 709/227 |
| 2008/0076386 A1 | 3/2008 | Khetawat et al. | |
| 2009/0129386 A1* | 5/2009 | Rune | 370/392 |
| 2011/0103303 A1 | 5/2011 | Hsu et al. | |
| 2011/0153819 A1* | 6/2011 | Zembutsu | 709/224 |
| 2012/0051348 A1 | 3/2012 | Zhu et al. | |
| 2012/0246466 A1* | 9/2012 | Salvarani | H04L 9/321 713/156 |
| 2013/0103833 A1* | 4/2013 | Ringland | H04L 63/0823 709/224 |

\* cited by examiner

*Primary Examiner* — Benjamin Lanier

(57) ABSTRACT

A request for an IP address for a client device having a first identifier information is received from an AP device. The request for the IP address is associated with a first communication protocol. The first identifier information is compared to a second identifier information. The second identifier information is associated with a second communication protocol. The second communication protocol is different from the first communication protocol. The IP address for the client device based on comparing.

30 Claims, 14 Drawing Sheets

| MAC address 1301 | Authentication 1302 |
|---|---|
| MAC 1 | Yes |
| MAC 2 | No |
| ... | ... |
| MAC N | Yes |

ID
METHODS AND APPARATUSES TO PROVIDE SECURE COMMUNICATION BETWEEN AN UNTRUSTED WIRELESS ACCESS NETWORK AND A TRUSTED CONTROLLED NETWORK

RELATED APPLICATIONS

This application is a continuation-in-part application of co-pending U.S. patent application Ser. No. 13/326,191, filed on Dec. 14, 2011, which claims the benefit of U.S. Provisional Application No. 61/627,792, filed on Oct. 17, 2011, which is incorporated by reference herein in its entirety.

FIELD

At least some embodiments of the present invention generally relate to wireless networking, and more particularly, to coupling an untrusted wireless access network to a trusted controlled network.

BACKGROUND

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Generally, Wi-Fi refers to a mechanism for wirelessly connecting electronic devices. A device enabled with Wi-Fi, e.g., a personal computer, video game console, smartphone, or digital audio player, can connect to the Internet via a wireless network access point. Multiple overlapping access points may cover large areas.

Generally, a cellular (mobile) network refers to a radio network distributed over land areas called cells, each served by at least one fixed-location transceiver known as a cell site or base station. When joined together these cells can provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

SUMMARY

Exemplary embodiments of methods and apparatuses to provide a communication between a wireless access network controlled by an access point (AP) device and a packet core network. A request for an IP address for a client device having a first identifier information is received from the AP device. The request for the IP address is associated with a first communication protocol. The first identifier information is compared to a second identifier information. The second identifier information is associated with a second communication protocol. The second communication protocol is different from the first communication protocol. The IP address for the client device based comparing.

In one embodiment, each of the first identifier information and the second identifier information includes a media access control (MAC) address.

In one embodiment, a request for an authentication for the client device is received from the AP. The request for the authentication has the first identifier information. Next, the request for the authentication is formatted. The formatted request for the authentication is transmitted to an authentication, authorization, and accounting (AAA) server. An authentication response for the first identifier information is received from the AAA server. The authentication response is stored in a memory.

In one embodiment, the request for the authentication and the request for the IP address are determined as related if the first identifier information matches with the second identifier information.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 13 illustrates a data structure containing a device identifier information according to one embodiment.

DETAILED DESCRIPTION

Figure 1A:
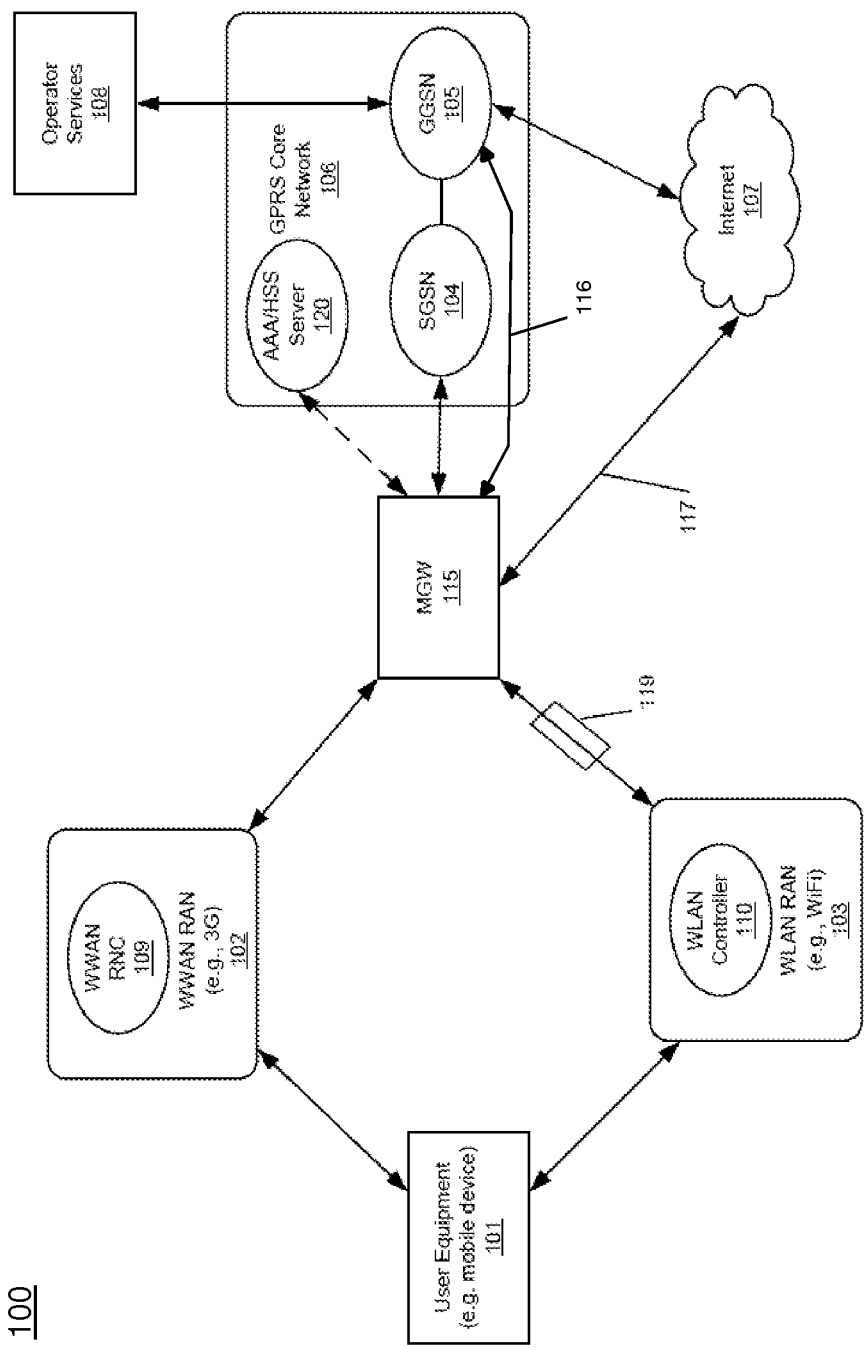
FIG. 1A is a block diagram illustrating an interworked WLAN and WWAN system according to at least one embodiment.

Exemplary embodiments of methods and apparatuses to couple an untrusted wireless access network to a trusted controlled network via a secure tunnel are described. In one embodiment, cellular-WiFi communication is provided via a secure Internet Protocol (IP) tunnel. Implementing cellular-WiFi communication via a secure tunnel between an access point (AP) device associated with the WiFi network and a cellular (packet core) network does not require Internet Protocol Security (IPSec)/Internet Key Exchange (IKE) on a user equipment (UE). In one embodiment, a secure IP tunnel is established between an access point (AP) device associated with a wireless access network and a gateway located at an edge of a mobile (packet core) network. In one embodiment, an IP address assigned to the UE is a private address provided from a mobile network address space, as described in further detail below.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g.; computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

FIG. 1A is a block diagram illustrating an interworked wireless local area network (WLAN) and wireless wide area network (WWAN) system according to one embodiment. Referring to FIG. 1A, user equipment (UE) 101 is communicatively coupled to radio network controller (RNC) 109 of a radio access network (RAN) 102. In order to access other networks such as Internet 107 and/or operator services node 108, UE 101 goes through gateway device 115 and/or a third generation partnership project (3GPP) packet core network 106. Typically, 3GPP packet core network 106 includes a serving General Packet Radio Service (GPRS) support node (SGSN) 104 and a gateway GPRS support node (GGSN)/packet data network (PDN) gateway (P-GW) 105. These support node SGSN and gateway node GGSN/P-GW relay communications between a user terminal (or source mobile station) and a destination. Note that typically, there may be multiple SGSNs associated with a GGSN, multiple RNCs associated with a SGSN, and multiple UEs associated with an RNC in a hierarchical structure (not shown). Note that throughout this application, GGSN and P-GW are interchangeable terms dependent upon the specific network configuration. Typically, GGSN is referred to a packet core component in a 3G network while a P-GW is referred to a packet core component in a 4G network. Also note that a packet core component may have functionalities of a GGSN and/or P-GW.

SGSN 104 and GGSN/P-GW 105 include a function of relaying communications between a user terminal (or source mobile station) and a destination node (e.g. a server in the Internet or another mobile station). SGSN 104 effects data transmission between UE 101 and GGSN/P-GW 105. For example, SGSN 104 collects up-link sessions from RNC 102 and distributes the down-link session delivered from GGSN/P-GW 105 toward RNC 102. SGSN 104 manages a packet service between SGSN 104 and GGSN/P-GW 105 by tunneling (e.g., GPRS tunneling protocol or GTP). SGSN 104 receives a subscriber profile stored in a home location register (HLR) and has therein at any time a copy thereof. The subscriber profile has information about the subscribed services (Internet, operator walled garden etc.)

GGSN/P-GW 105 functions as a logical interface to an external data packet network such as Internet 107 and/or operator services node 108. GGSN/P-GW 105 operates for coupling between core network 106 and such external packet data networks 107 and 108. More specifically, GGSN/P-GW 105 collects up-link sessions from SGSN 104 and accesses Internet 107 and/or operator services 108. GGSN/P-GW 105 in the 3GPP packet core network 106 sets up a tunnel down to SGSN 104 for down-link sessions.

UE 101 may be any of a variety of mobile devices, such as a Smartphone, tablet, a laptop, a gaming device, and/or a media device, etc., having the capability of communicating with a mobility gateway device (MGW) 115 (e.g., a SSX device from Stoke Inc., of Santa Clara, Calif.) via a variety of RANs. In at least some embodiments, MGW 115 includes a mobile data offloading/packet data gateway/tunnel terminal gateway. In one embodiment, UE 101 can also access MGW 115 via WLAN controller 110 (e.g., an access point) of WLAN RAN 103. As shown in FIG. 1A, a secure tunnel (IPsec) 119 is established between the WLAN controller 110 and MGW 115, as described in further detail below. As shown in FIG. 1A, a WLAN RAN 103 is coupled to a broadband provider (e.g., a broadband remote access server or BRAS). UE 101 can roam between RAN 102 and RAN 103 while maintaining the same communications session (e.g., mobility) with a remote entity such as operator service node 108 or Internet 107, in which the mobility is managed by MGW 115. MGW 115 includes capability of offload Internet-bound traffic to Internet 107 without going through at least SGSN 104 of core network 106. MGW 115 is also referred to herein as a mobile data offload gateway (MDO-GW) device for offloading traffic to Internet 107 without having to go through WWAN core network 106.

In one embodiment, MGW 115 is configured to interpret the control traffic flowing between UE/RNC and SGSN. Particularly, MGW 115 is configured to examine the control traffic to determine whether UE 101 is attempting to establish a communication path with the Internet 107 or operator services 108. If the traffic is for operator's services 108, both the control traffic and the associated data traffic are allowed to reach, via SGSN 104 for transfer to GGSN/P-GW 105 in order to reach operator's services 108. In at least some embodiments, MGW 115 directly communicates the control traffic and the associated data traffic to GGSN/P-GW 105 via a path 116 (e.g., a GTP tunnel). In this scenario, the IP address (by which UE 101 is represented to the operator's services 108) is allocated by GGSN/P-GW 105 and IP routers are configured to route all traffic destined to this IP address to GGSN/P-GW 105 which in turn tunnels the data to UE 101. Thus, MGW 115 does not interfere with the control traffic that is exchanged between UE 101 and the 3GPP packet core network 106 for registering UE 101 with the network 106, as well as the mutual authentication between UE 101 and network 106. If it is determined that the specific traffic flow is to be offloaded, MGW 115 directs that traffic to Internet 107 via path 117, bypassing SGSN 104 and/or GGSN/P-GW 105 of 3GPP packet core network 106. Thus, only the selected traffic is diverted directly to the Internet 107, while the rest of the traffic will be allowed to enter 3GPP packet core network 106.

Note that throughout this description, a 3G RAN and an RNC are used as an example of an access network and a gateway device. However, the present invention is not limited to use in network with these components. Other configurations may also be applied. For example, RAN 103 may be a femto cell while WLAN controller 110 may be a femto gateway device. Further detailed information concerning the offloading techniques of MGW 115 can be found in co-pending U.S. patent application Ser. No. 12/425,853, entitled "Method and System for Bypassing 3GPP Packet Switched Core Network when Accessing Internet from 3GPP UEs using 3GPP Radio Access Network," filed Mar. 31, 2009, which is incorporated by reference herein in its entirety.

Referring back to FIG. 1A, for the purpose of illustration, according to one embodiment, Wi-Fi equipped UE 101 detects Wi-Fi access network and initiates 802.1x based authentication with WiFi controller 110. UE 101 can use any extensible authentication protocol (EAP) based authentication, such as EAP-subscriber identity module (EAP-SIM) and/or EAP-AKA protocols. A network access identifier (NAI) used in the IEEE 802.1x exchange contains the information identifying a mobile network operator (MNO) that informs an access point (AP) or WiFi controller 110 to initiate an EAP or a remote authentication dial-in user service (RADIUS) authentication session towards MGW 115. The EAP-AKA/EAP-SIM exchange may be completed against a 3GPP authentication, authorization, and accounting (AAA) server or home subscriber server (HSS) 120. If the MNO network does not have a 3GPP AAA server, MGW 115 can fulfill this role and interact with the associated HSS directly. Upon successful authentication, MGW 115 is configured to convey encryption keys securely to WiFi controller 110. In at least some embodiments, IPsec tunnel 119 between the WLAN controller 110 and MGW 115 is a static channel established before the authentication stage. In at least some embodiments, IPsec 119 is a dynamic channel established, for example, via a discovery mechanism, as set forth in further detail below. As will be described in details further below, this lays the foundation for seamless mobility across a WLAN to a WWAN. In addition, it allows an operator to run analytics on all user traffic. The seamless mobility is an important feature of cellular networks. The seamless mobility refers to the ability to have continued service as the user moves that makes the mobile service appealing. The mobility may include wide area roaming and session handover. Both play important role in achieving the desired user experience. Wide area roaming means the ability to automatically discovers and secure access rights through a point of attachment to a network over the coverage area. For a data session, handover means changing the point of attachment while maintaining the same IP address and with minimal packet loss. In one embodiment, MGW 115 is configured to buffer packets received from UE 101 or from the network (e.g., Internet or core network) while the handover is being processed. Once the handover has been completed, MGW 115 is configured resume routing of the packets using the proper IP address. In mobile devices where power is at a premium, resetting connections or IP stack is undesirable since one ends up consuming more power for the same task.

According to one embodiment, UE 101 moves in WiFi coverage area 103 and starts an association and session establishment procedure with WiFi controller 110. During the WiFi session setup, MGW 115 can assign an IP address to WiFi capable UE 101. In one embodiment, MGW 115 communicates an IP address to the WLAN controller that was assigned to the user equipment during the active session of the WWAN, where this WWAN assigned IP address is used by WLAN controller 110 to identify the traffic to/from the UE 101 while WLAN controller 110 is communicatively coupled to the WLAN and tunnels that UE traffic between MGW 115 and WLAN controller 110.

For example, MGW 115 can assign an IP address allocated from its IP address pool if the session is to be offloaded to Internet 107 bypassing core network 106. Alternatively, MGW 115 can assign an IP address allocated by GGSN/P-GW 105 if the session is to access core network 106. In order to provide seamless mobility, MGW 115 examines whether there is already a macro session, e.g., 3G session via 3G RAN 102 ongoing for the same user. If so, it assigns the same IP address and switches the data traffic to established IPsec tunnel ("channel") towards WiFi controller 110. In one embodiment, WiFi controller 110 then maps this GTP session to an 802.11 session (e.g., WiFi session) towards UE 101. Specifically, for packets coming from the network side (e.g., core network 106 or Internet 107), WiFi controller 110 decapsulates the packet and then encrypts the inner packet as per WiFi protocol (e.g., 802.11i protocol) and sends it towards UE 101. For the packets coming from UE 101, WiFi controller 110 is configured to decrypt the packet and then to send the packet via the IPsec tunnel towards MGW 115. MGW 115 has the ability to interface with external packet data networks including Internet 107. MGW 115 also serves as the anchor when UE 101 moves across Wi-Fi RAN 103 (also referred to as a micro network) and macro RAN 102.

According to another embodiment, when UE 101 moves out of Wi-Fi coverage 103 into 3G macro RAN 102, UE 101 may initiate an attach and session activation with core network 106. Since MGW 115 is located between RAN 102 and the core network 106, MGW 115 sees the signaling and detects that the incoming PDP activation is for a UE that is already active on Wi-Fi network 103, for example, based on the unique identifier (e.g., an international mobile subscriber identifier IMSI) of the UE. This scenario applies to UE 101 waking up from an idle mode as well. By correlating these two paths towards UE 101, MGW 115 assigns the same IP address that has been assigned to the WiFi network session to the incoming 3G session. MGW 115 then switches onto the GTP data path towards the RNC 102. Since in most cases the macro network provides the wider umbrella coverage, in one embodiment, the packet data protocol (PDP) context may be preserved at UE 101 so that UE 101 does not go through unnecessary session set and tear down; rather UE 101 can use idle mode signaling. MGW 115 is also capable of correlating an idle session, which is useful for battery life preservation on the handset.

Figure 2:
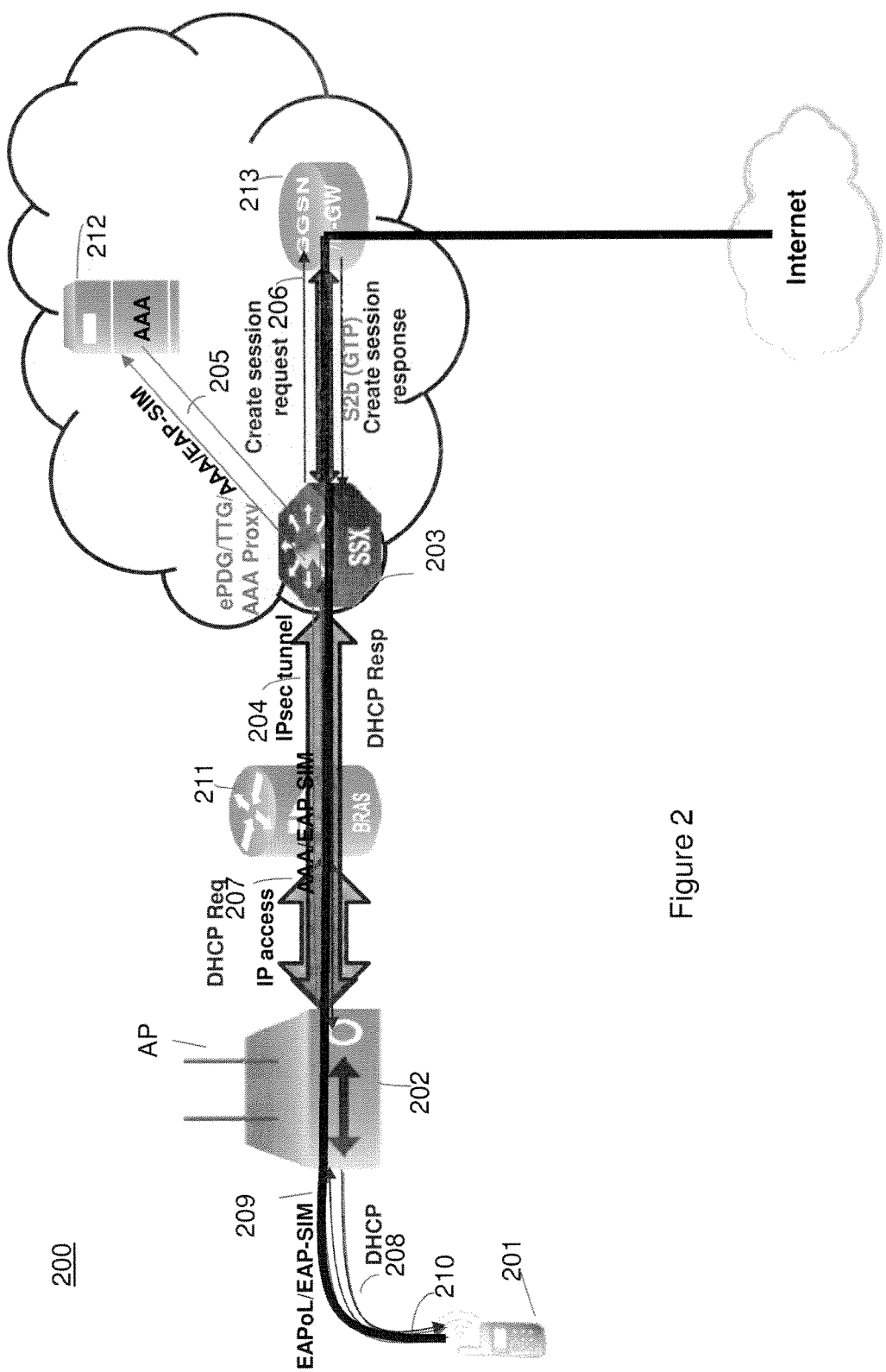
FIG. 2 shows a diagram to provide a cellular-WiFi communication according to one embodiment of the invention.

FIG. 2 shows a diagram 200 of a system to provide cellular-WiFi communication according to one embodiment of the invention. As shown in FIG. 2, a UE wireless device 201 (e.g., a mobile phone) is communicably coupled 209 to an access point 202 in a wireless network (e.g., a WiFi network). In one embodiment, the wireless network including access point 202 and the device 201 is not trusted by a mobile (e.g., cellular) network (e.g., a Packet Core network). In one embodiment, the wireless network is a WiFi network.

As shown in FIG. 2, access point 202 is communicably coupled to a mobility gateway 203 via an IP secure tunnel 204. In one embodiment, the mobility gateway 203 is located at an edge of a mobile network and is communicably coupled to a mobile network gateway 213 via a mobile network tunnel 206. The gateway 203 is also communicably coupled to an AAA server 212. The mobile network gateway (e.g., GGSN/P-GW) 213 is communicably coupled to the Internet. In one embodiment, a WiFi access network is controlled by the mobile (cellular) operator network (e.g., Packet Core Network) as a part of the mobile operator trusted network via a secure tunnel. That is, an operator of a mobile network can communicably couple a untrusted WiFi access network to the operator's own trusted controlled radio network. In one embodiment, a cellular (mobile operator) network has its own IP address space. An IP address from the cellular network space is assigned to a UE device 201 (e.g., a mobile phone).

The device 201 and an access point (AP) 202 in the wireless network (e.g., wireless LAN or WLAN) are connected through a layer two connection (e.g., layer-two switching). As shown in FIG. 2, network traffic is forced through an IP secure tunnel ("IPsec") 204 established between the access point (AP) 202 and a gateway (MGW) 203 (e.g., a SSX device from Stoke Inc., of Santa Clara, Calif.). Internet Protocol Security (IPsec) refers to a protocol suite for securing Internet Protocol (IP) communications by authenticating and encrypting each IP packet of a communication session. In at least some embodiments, IPsec also includes protocols for establishing mutual authentication between agents (e.g., AP 202 and gateway 203) at the beginning of the session and negotiation of cryptographic keys to be used during the session. Generally, IPsec can be an end-to-end security scheme operating in the Internet Layer of the Internet Protocol Suite. It can be used in protecting data flows between a pair of hosts (host-to-host), between a pair of security gateways (network-to-network), or between a security gateway and a host (network-to-host). Generally, Internet Key Exchange (IKE or IKEv2) is a protocol used to set up a security association (SA) in the IPsec protocol suite.

As shown in FIG. 2, gateway 203 provides an IP address to the device 201 via a IP secure tunnel 204. A device communicatively coupled to a WiFi network and a cellular network, gets continuous connectivity. In at least some embodiments, the IP address of the device communicatively coupled to a WiFi network and a cellular network is maintained the same. In one embodiment, an IP secure tunnel 204 into which network traffic between one or more devices, such as a device 201 and a gateway 203 (e.g., a SSX device) is forced is a static channel. In another embodiment, an IP secure tunnel into which network traffic between one or more devices and a gateway (e.g., a SSX device) is forced is established dynamically e.g., via a discovery mechanism.

In one embodiment, an access point (AP) 202 in a wireless network obtains an Internet Protocol (IP) access from a provider 211. The access point 202, for example, can be connected to the Internet via a Digital Subscriber Line (DSL) to an Internet Service Provider (ISP) gateway. A user equipment device 201 can be for example, a mobile phone, or any other wireless device. In one embodiment, a WiFi access point (AP) 202 obtains an Internet Protocol (IP) access 207 from a broadband provider (e.g., BRAS). In another embodiment, the AP obtains an IP access from a broadband network.

Next, an IP secure tunnel, such as an IP secure tunnel 204 between the AP (e.g., AP 202) and a gateway (e.g., gateway 203) is established. The IP secure tunnel depending on the network can be static or dynamic. In one embodiment, a static IPsec tunnel is established between the AP and Enhanced Packet Data Gateway (e.g., an ePDG SSX) for an untrusted network between the AP (e.g., 202) and the gateway (e.g., 203). In another embodiment, a layer Virtual Private Network (VPN) or Virtual Private LAN Service (VPLS) is dynamically used to force traffic towards the gateway (e.g., a SSX) without requiring an IPSec tunnel.

Figure 3:
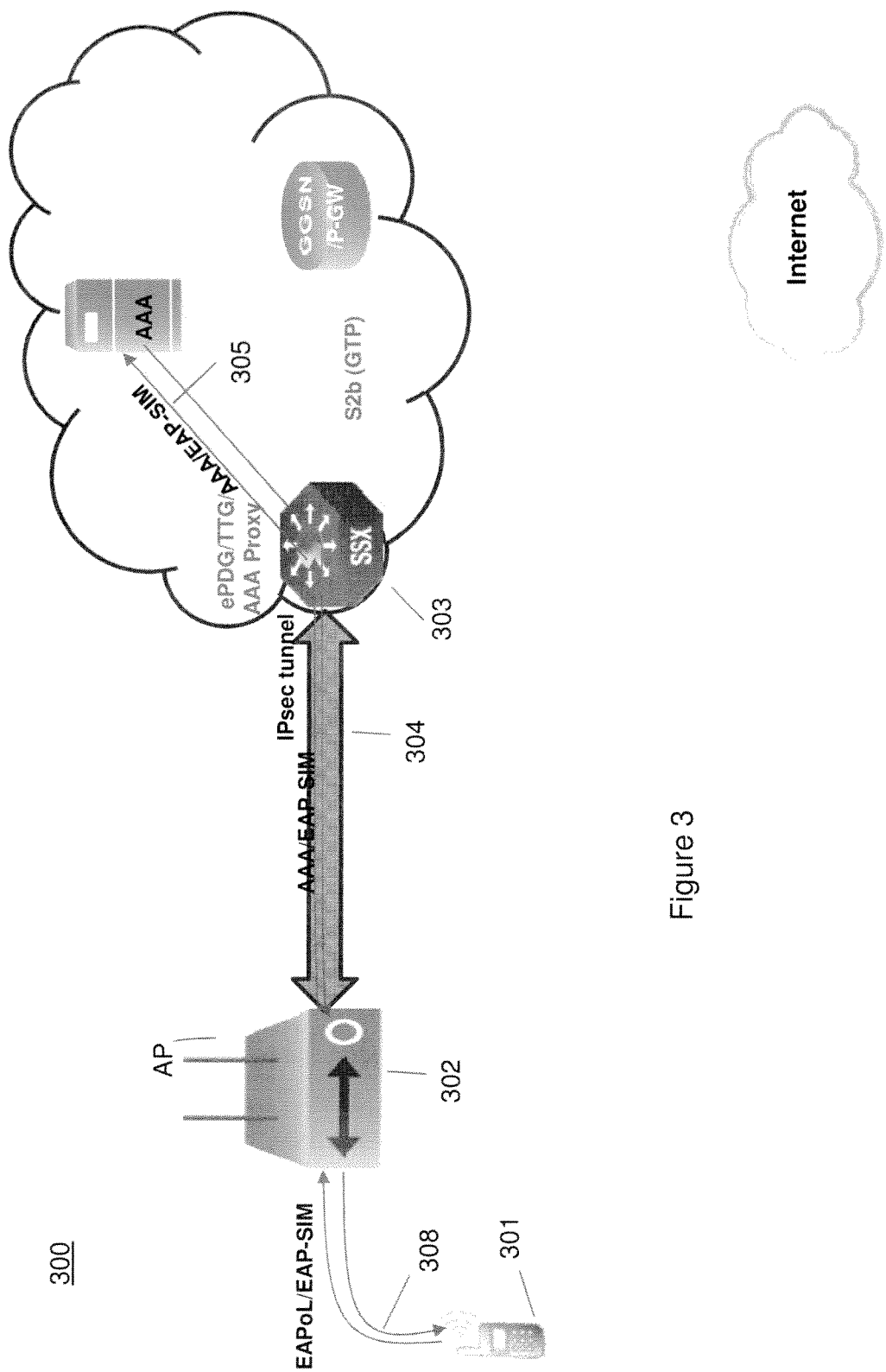
FIG. 3 shows a diagram to provide an authentication between networks, according to one embodiment of the invention.

FIG. 3 shows a diagram 300 to provide authentication between two networks, such as WiFi network and a cellular network, according to one embodiment. As shown in FIGS. 2 and 3, a UE device (e.g., one of UE device 201 and a UE device 301) is authenticated (e.g., 210, 308) by an AP (e.g., one of AP 202 and AP 302). In one embodiment, after the device is associated with the AP and receives a service set identifier (SSID), the AP initiates an authentication protocol (e.g., EAPoL/EAP-SIM (802.1x)) to authenticate the device. Generally, Extensible Authentication Protocol Method for GSM Subscriber Identity Module (EAP-SIM) is an Extensible Authentication Protocol (EAP) mechanism for authentication and session key distribution using the Subscriber Identity Module (SIM) from the Global System for Mobile Communications (GSM). In one embodiment, the device is authenticated (205, 305) for an WLAN access by a service provider authentication, authorization and accounting protocol (AAA) server, such as a server 212, as shown in FIGS. 2 and 3.

As shown in FIGS. 2 and 3, identity information is transported to a MGW gateway (e.g., one of gateway 203 and gateway 303). In one embodiment, the MGW gateway acts as an AAA proxy. In one embodiment, when the static IPsec tunnel between the AP and the gateway (e.g., MGW) is established, the AP forces one or more authentication messages including the identity information into the static IPsec tunnel such as tunnels 204 and 304 by default. In another embodiment, when the IP security tunnel is established dynamically, the AP is configured to perform a discovery of an AAA proxy. In this case, the AP transports one or more messages including the identity information to the gateway acting as the AAA proxy as part of the discovery mechanism. In one embodiment, the AP uses any AAA protocol (e.g., RADIUS/DIAMETER protocol) to transport an Extensible Authentication Protocol Subscriber Identity Module (EAP-SIM) information 305 to the AAA Proxy.

In one embodiment, the gateway (e.g., SSX) behaves as an AAA proxy and proxies the AAA/EAP-SIM information (e.g., one of 205 and 305) to an AAA server, as shown in FIGS. 2 and 3. The gateway (e.g., SSX) also keeps some information about the user, for example, Mobile Subscriber number—IMSI (International Mobile Subscriber Identify), MAC address of the Wi-Fi radio on User Equipment, Service authorization data, and other user related information.

Next, an AAA response is transported back to the AP. In one embodiment, the gateway acting as an AAA proxy (e.g., one of 203, 303, 403, and 503) transports the AAA response back to the AP via the secure IP tunnel, such as tunnels 204 and 304.

Figure 6:
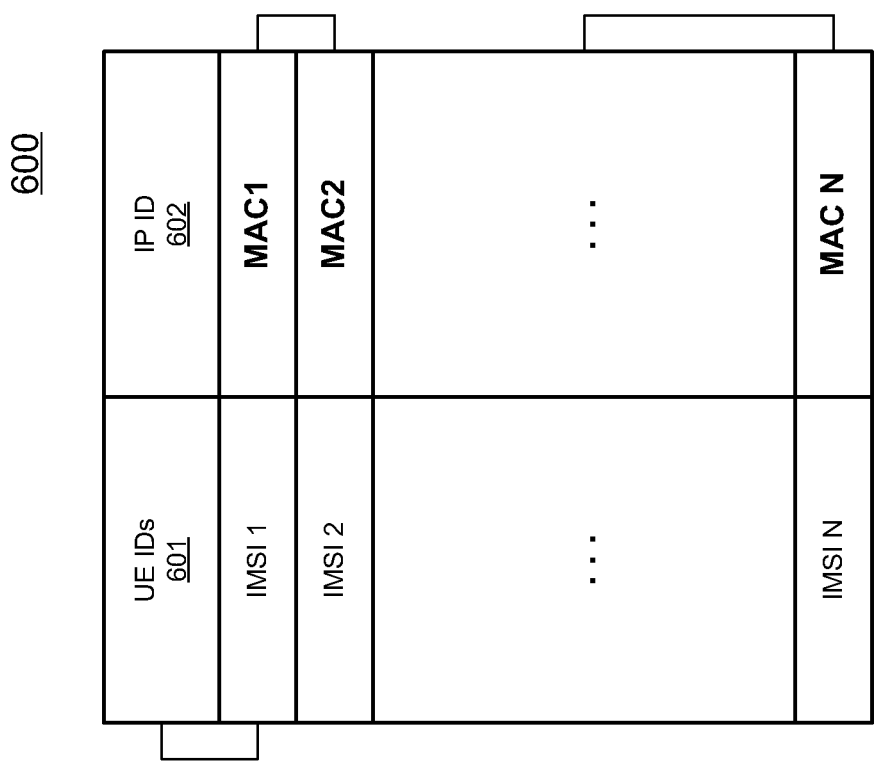
FIG. 6 illustrates a data structure representing a mapping table according to one embodiment.

In one embodiment, mapping between a user identity and a gateway network identity is generated and stored in a memory at a gateway acting as an AAA proxy. In one embodiment, a Media Access Control (MAC) address of an user equipment, a MAC address of an access point, and an IP address of the access point are mapped against the identity of a mobile subscriber (e.g., IMSI). In one embodiment, the mapping between the IP access level identifiers and the mobile subscriber identifiers is generated and stored at a gateway acting as an AAA proxy in a mapping data structure 600 similar to one as shown in FIG. 6.

At this point, the UE (e.g., 201 and 301) has been successfully authenticated by the service providers AAA server, and the context is cleared for the device. Next, provisioning of an IP address is performed, as shown in FIGS. 2 and 4.

Figure 4:
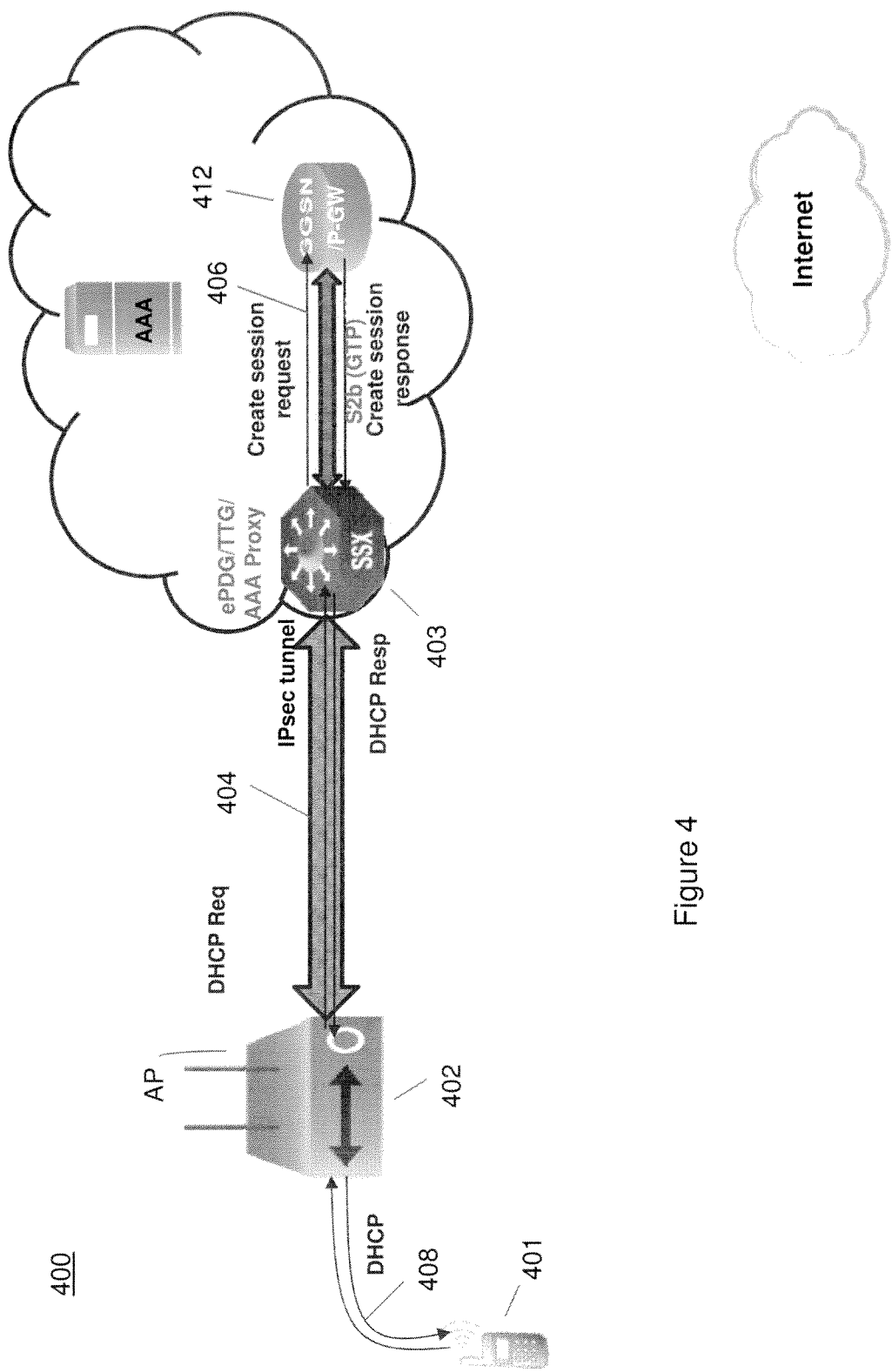
FIG. 4 shows a diagram to perform provisioning of an IP address according to one embodiment of the invention.

FIG. 4 shows a diagram 400 of a system to perform provisioning of an IP address between networks such as a WiFi network and a cellular network according to one embodiment of the invention. In one embodiment, the UE device (e.g., one of UE device 201 and UE device 401) starts a Dynamic Host Configuration Protocol (DHCP) (e.g., 208, 408) to get an IP address provisioned, and the gateway (e.g., one of gateway 203 and gateway 403) behaves as a DHCP server, as shown in FIGS. 2 and 4. As shown in FIGS. 2 and 4, the access point (e.g., one of AP 202 and AP 402) relays the DHCP request to the gateway via a IP secure tunnel (e.g, one of tunnel 204, and tunnel 404).

In one embodiment, the access point behaves as a DHCP relay agent and adds identity information of the UE into the DHCP request to send, via the IP secure tunnel, to the gateway. In one embodiment, the AP/Controller identifies the client using IMSI and/or MAC and/or Pseudo-IMSI to hide the subscriber identify field to send the UE identity to the gateway. For example, the AP/Controller can use option 61, or option 82 sub-option 6, or any other option to incorporate the UE identity to send to the gateway. In one embodiment, the AP adds a mobile subscriber identity into the DHCP request. The mobile subscriber identity can be, for example, an International Mobile Subscriber Identity (IMSI) it has from the EAP-SIM authentication to the gateway (e.g., SSX). As shown in FIG. 6, mobile subscriber identity (e.g., IMSI) can be stored in a field 601 of the data structure 600. Generally, IMSI is a unique identification associated with mobile network phone users. It is typically stored as a 64 bit field inside a device, e.g., a phone, and is sent by the device to a network. In another embodiment, the access point adds an IP level access identity into the DHCP request (e.g., a MAC address) to send through the IP secure tunnel. As shown in FIG. 6, IP level access identity (e.g., MAC address) can be stored in a field 602 of the data structure 600.

In one embodiment, a session towards a mobile operator network gateway (e.g., GGSN/PGW) is created based on the UE identity. As shown in FIGS. 2 and 4, upon receiving the DHCP request, the gateway, (e.g., one of gateway 203 and gateway 403) initiates a S2b (GTP) create session request towards GGSN/PGW to get the IP address. In one embodiment, the gateway (e.g., a SSX) uses a user identifier (e.g., IMSI, MAC address) and other provisioned fields to create a S2b (GTP) session towards a mobile network gateway (e.g., P-GW/GGSN). The mobile network can be 3G, 4G, or any other mobile network. A P-GW/GGSN is a Packet Data Network (PDN) Gateway used in LTE/4G networks. The Gateway General packet radio service (GPRS) Support Node (GGSN) is a component of the GPRS network. The GGSN can be responsible for the communication between the GPRS network and external packet switched networks, like the Internet and X.25 networks.

In one embodiment, a mobile network tunnel, such as tunnels 206 and 406, is set up between a gateway (e.g., MGM, SSX) acting as a AAA proxy (e.g., one of gateway 203, and gateway 403) and a mobile network gateway, such as gateway 213 and gateway 412 (e.g., P-GW/GGSN). In one embodiment, a mobile network (e.g., a GTP-U) tunnel is set up between a gateway acting as ePDG/Tunneling Terminating Gateway (TTG) proxy, such as gateway 203 and gateway 403 and a mobile network gateway, such as gateway 213 and 412 (e.g., P-GW/GGSN).

In one embodiment, the gateway (e.g., 203 and 403) receives a create session response from the mobile network gateway (e.g., P-GW/GGSN) including an IP address via the mobile network (e.g., GTP-U) tunnel, as shown in FIGS. 2 and 4. In one embodiment, a gateway (e.g., SSX) acting as an ePDG/TTG/AAA proxy forces the P-GW/GGSN assigned IP address in the DHCP response through the IP secure tunnel to the AP to relay to the UE device, as shown in FIGS. 2 and 4. A general packet radio service Tunneling Protocol GPRS GTP is a group of IP-based communications protocols used to carry General Packet Radio Service (GPRS) within GSM, UMTS and LTE networks. Typically, a GTP-U is used for carrying user data within the GPRS Core Network and between the Radio Access Network and the core network. The UE device (e.g., one of 201 and 401) receives the mobile network assigned IP address relayed via the AP by the gateway (e.g., SSX) via a secure IP channel, as shown in FIGS. 2 and 4.

Figure 5:
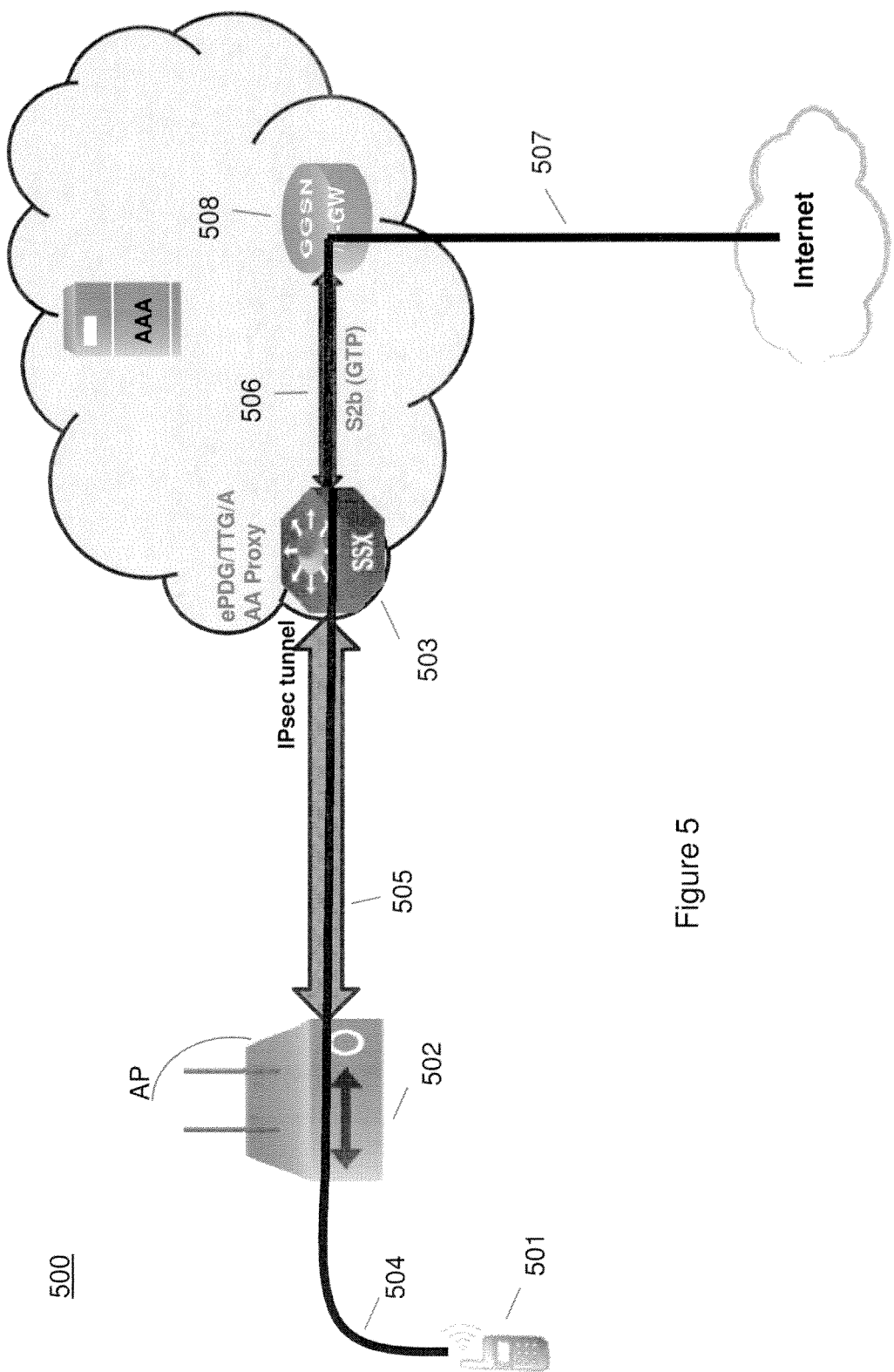
FIG. 5 shows a diagram to communicate data packets between two networks according to one embodiment of the invention.

FIG. 5 shows a diagram 500 of a system to communicate data packets between two networks such as a WiFi network and a cellular network according to one embodiment of the invention. In one embodiment, the UE device, such as a UE device 201 and UE device 501, uses the mobile network (e.g., P-GW/GGSN) assigned IP address as a source for its data packets. In one embodiment, the AP/Controller (e.g., AP 202 and AP 502) forwards the data packets towards the gateway (e.g., gateway 203 and gateway 503) (e.g., SSX) acting as a ePDG/TTG proxy through the IPsec tunnel, such as tunnel 204 and tunnel 505, as shown in FIGS. 2 and 5 respectively. In one embodiment, the gateway, such as gateway 203 and gateway 503 (e.g., SSX) acting as an ePDG/TTG proxy forwards the data packets through a mobile network channel (e.g., GTP-U) (e.g., channel 206 and channel 506) towards a mobile network gateway (e.g., gateway 213 and gateway 508) (e.g., P-GW/GGSN), as shown in FIGS. 2 and 5. In one embodiment, the mobile network gateway (e.g., gateway 213 and gateway 508) (e.g., P-GW/GGSN) forwards the data packets (e.g., 507) towards a service provider network (e.g. Internet), as shown in FIGS. 2 and 5.

In one embodiment, a local IP is assigned to a device (e.g., UE) by the AP while a Domain Name System (DNS) can be used for a SSX discovery for both AAA Proxy role and PDG/ePDG role. The DNS typically associates various information with domain names assigned to each of the participating devices in a network. For example, DNS translates domain names meaningful to humans into the numerical identifiers associated with networking equipment devices for the purpose of locating and addressing these devices.

In one embodiment, a gateway (e.g., SSX) acting as a n DHCP server can provide just one IP address and maintains mapping of different public data network (PDN) assigned IP addresses to the IP address assigned by DHCP options (multiple Tunnels from SSX to various PDN-GWs). As set forth above, the communication between an access point (AP) device and a packet core network becomes secure without need to run an IP secure protocol on a client device (UE). This can save the battery power on the UE. Establishing the fully secure communication between the UE and the packet core network while saving the UE power provides a significant advantage for the mobile technology world.

Figure 8:
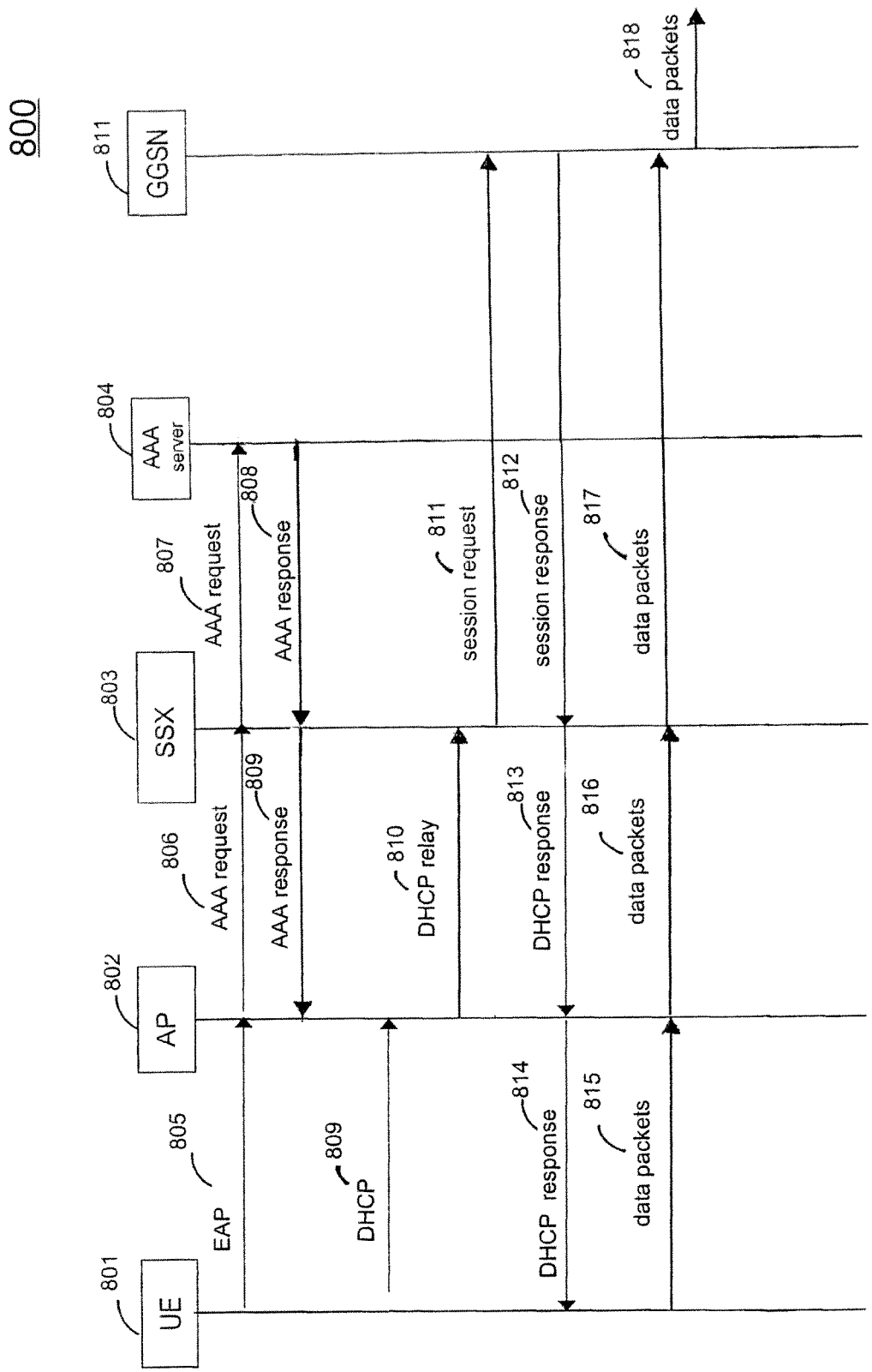
FIG. 8 is a transaction diagram illustrating a method to provide a secure communication between an untrusted wireless access network and a trusted controlled network according to one embodiment.

FIG. 8 is a transaction diagram 800 illustrating a method to provide a secure communication between an untrusted wireless access network and a trusted controlled network according to one embodiment. In one embodiment, a WiFi access point 802 gets an IP access from a broadband provider (e.g., BRAS), as described above. A static IPsec tunnel is established between the AP 802 and a SSX device 803 (ePDG SSX) for untrusted network between AP 802 and device 803, as described above. Alternatively, a layer VPN or VPLS can be used to force traffic towards the SSX without requiring IPSec tunnel, as described above. After a UE 801 attaches to the SSID, it initiates an EAP request 805 EAPoL/EAP-SIM (802.1x) for authentication. AP 802 uses any AAA protocol (RADIUS/DIAMETER) to transport the AAA request 806 (e.g., EAP-SIM) to the gateway 803 that behaves as a AAA Proxy. Next, SSX device 803 proxies the AAA request 807 (e.g., AAA/EAP-SIM) to AAA server 804. Also the SSX device 803 keeps some information about the user. After receiving AAA response from AAA server 804, SSX device 803 transports the AAA response 809 back to the AP 802. At this point UE has been successfully authenticated by the service providers AAA server 804.

Next, UE 801 starts DHCP 809 to get IP address provisioned. AP/Controller 802 behaves as a DHCP relay agent to relay the UE identity (e.g., IMSI) 810 it has from the EAP-SIM authentication to SSX device 803. AP/Controller 802 can use, for example, option 61, option 82 sub-option 6, or any option in which the UE identity can be incorporated. SSX device 803 uses the client identifier provided in the option 61 field and other provisioned fields required to create a session 811 towards a P-GW/GGSN 811. A session response 812 is transmitted from GGSN 811. A GTP-U tunnel is setup between SSX device (ePDG/TTG) 803 and P-GW/GGSN 811. SSX device 803 sends the P-GW/GGSN 811 assigned address in the DHCP response 813 to AP 802 that relays the DHCP response 814 to UE 801. UE 801 uses the P-GW/GGSN assigned IP address as the source for its data packets 815. AP/Controller 802 forwards these data packets 816 through the IPsec tunnel towards the SSX device 803 (ePDG/TTG). SSX device 803 (ePDG/TTG) forwards these data packets 817 through the GTP-U towards P-GW/GGSN 811. P-GW/GGSN 811 forwards these packets 818 towards the service provider network.

Figure 7:
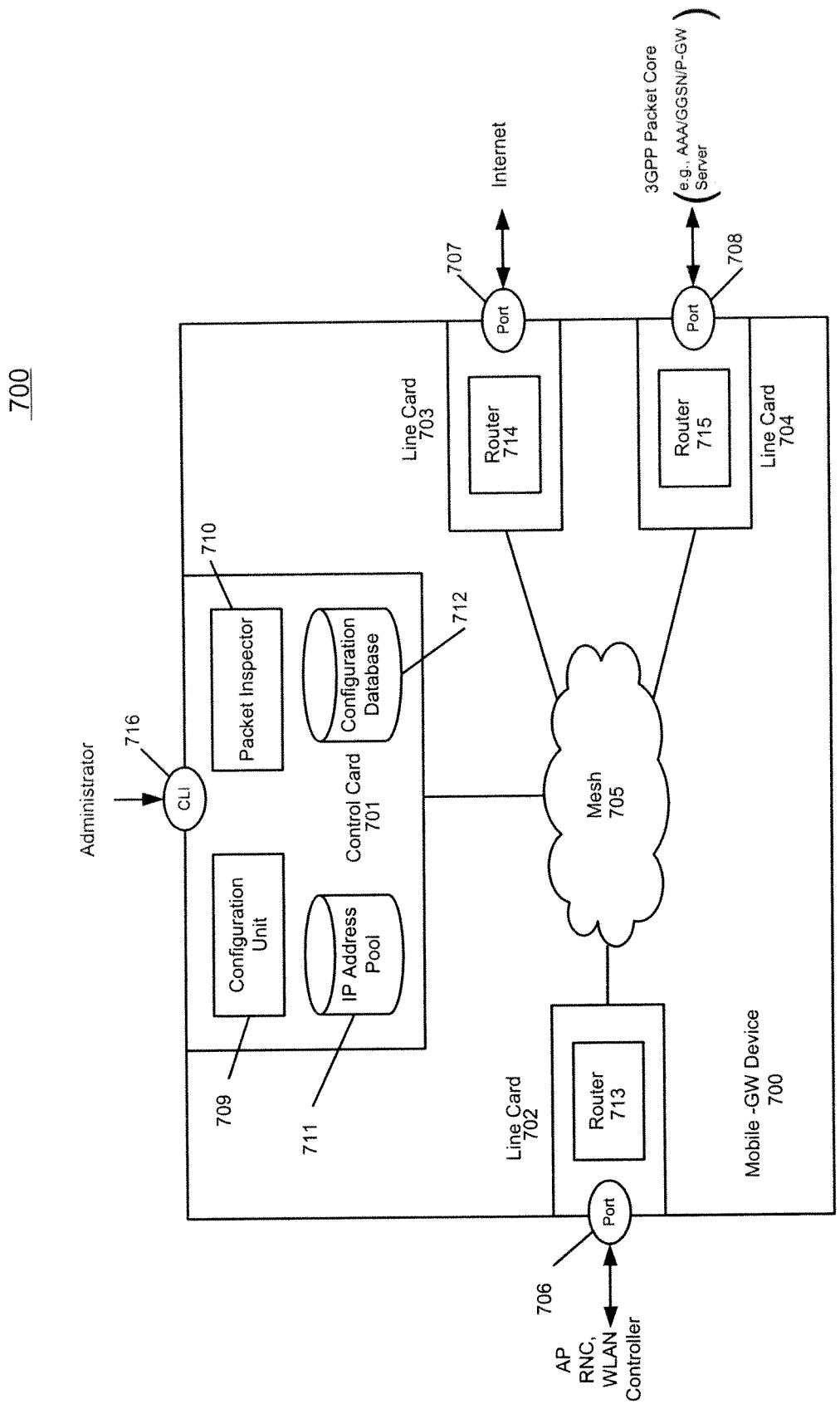
FIG. 7 is a block diagram illustrating a mobility gateway device according to one embodiment.

FIG. 7 is a block diagram 700 illustrating a mobility gateway device according to one embodiment of the invention. For example, MGW 700 may be implemented as a part of MGW 115 of FIG. 1. Referring to FIG. 7, MGW 700 includes, but is not limited to, a control card 701 (also referred to as a control plane) communicatively coupled to one or more line cards 702-704 (also referred to as interface cards or user planes) over a mesh 705, which may be a mesh network, an interconnect, a bus, or a combination thereof. Each of the line cards 703-704 is associated with one or more interfaces (also referred to as ports), such as interfaces 706-708 respectively. Each line card includes routing functional block (e.g., blocks 713-715) to route packets via the corresponding interface according to a configuration (e.g., routing table) configured by control card 701. For the purpose of illustration, it is assumed that interface 706 is to be coupled to an access point as in FIGS. 2-5, an RNC of a RAN or a WLAN controller of a WLAN as set forth in FIG. 1A; interface 707 is to be coupled to the Internet as in FIGS. 1-5; and interface 708 is to be coupled to a 3GPP packet core network (e.g., an AAA server/GGSN/P-GW), as in FIGS. 2-3.

According to one embodiment, control card 701 includes a configuration unit 709, a packet inspector 710, an IP address pool database 711, and a configuration database 712. In one embodiment, database 712 is used to store information regarding which access point names (APNs) of which the traffic should be diverted to the Internet directly bypassing the 3GPP packet core network. In addition, database 712 may also be utilized to store the mapping table for the IP addresses such as data structure 600 of FIG. 6. At least a portion of information stored in database 712 may be pushed down to line cards 702-704, for example, as part of a routing table (not shown). As described above, an administrator can configure or specify via a User Interface (e.g. command line interface (CLI)) 716 which APNs for the purpose of Internet breakout. Through User Interface 716, the administrator can also enable and/or disable a specific APN for Internet breakout purposes (e.g., by removing or adding APNs)

In one embodiment, packet inspector 710 is configured to inspect session initiation request control packets to establish a connection to determine whether the traffic is to be Internet bound by comparing the APN values provided in the request and the APNs stored/configured in database 712. Based on the configuration set up by control card 701, a packet router functional block of each line card is configured to route the corresponding data packets to the Internet directly, for example, via interface 707, bypassing the 3GPP packet core network. Otherwise, if configuration unit 709 determines that a packet is destined for the 3GPP packet core network, the packet router would route the packet to the 3GPP packet core network, for example, via interface 708.

Note that some of the functionality of control card 701 may be delegated or replicated to a line card. For example, certain information of database 712 may be replicated to line cards 702-704 and stored in a storage location (not shown) within line cards 702-704. Also note that some or all of the components as shown in FIG. 7 may be implemented in hardware, software, or a combination of both.

Figure 1B:
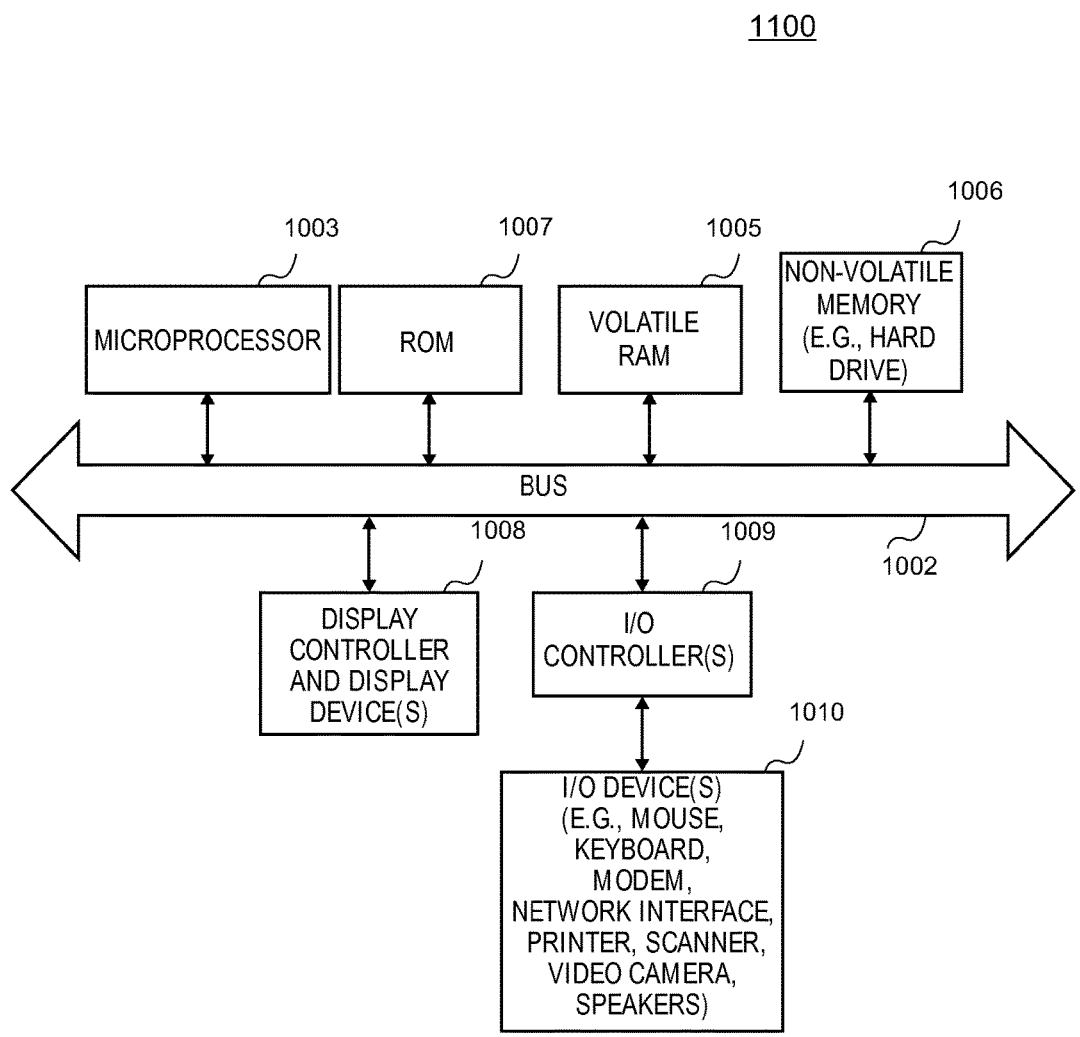
FIG. 1B shows one example of a data processing system according to at least one embodiment.

FIG. 1B shows one example of a data processing system 1100 used to perform the embodiments of the present invention. As shown in FIG. 1B, the data processing system 1100, which is a form of a data processing system, includes a bus 1002 which is coupled to a microprocessor 1003 and a ROM 1007 and volatile RAM 1005 and a non-volatile memory 1006. The microprocessor 1003, which may be, for example, a PPC microprocessor from Motorola, inc., or freescale, or Intel processor, may be coupled to a cache memory (not shown). The bus 1002 interconnects these various components together and also interconnects these components 1003, 1007, 1005, and 1006 to a display controller and display device(s) 1008 and to peripheral devices such as input/output (i/o) devices which may be mice, keyboards, modems, network interfaces, printers, scanners, video cameras, speakers, and other devices which are well known in the art. Typically, the input/output devices 1010 are coupled to the system through input/output controllers 1009. The volatile RAM 1005 is typically implemented as dynamic ram (dram) which requires power continually in order to refresh or maintain the data in the memory. The non-volatile memory 1006 is typically a magnetic hard drive or a magnetic optical drive or an optical drive or a dvd ram or other type of memory systems which maintain data even after power is removed from the system. Typically, the non-volatile memory will also be a random access memory although this is not required.

While FIG. 1B shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers and/or adapters as is well known in the art. In one embodiment the I/O controller 1009 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system, or an embedded system, or other data processing system in response to its processor, such as a microprocessor, executing sequences of instructions contained in a memory, such as ROM 1007, volatile RAM 1005, non-volatile memory 1006, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1003, or microcontroller.

A machine readable medium can be used to store software and data which when executed by a data processing system causes the system to perform various methods of the present invention. This executable software and data may be stored in various places including for example ROM 1007, volatile RAM 1005, and non-volatile memory 1006 as shown in FIG. 1B. Portions of this software and/or data may be stored in any one of these storage devices.

Thus, a machine readable medium includes any mechanism that provides (e.g., stores and/or transmits) information in a form accessible by a machine (e.g. a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays (FPGA), or Application Specific Integrated Circuit (ASIC)) or shared circuitry (e.g., microprocessors or microcontrollers under control of program instructions stored in a machine readable medium). Embodiments of the present invention can also be implemented as computer instructions for execution on a data processing system, such as system 1100 of FIG. 1B.

Note that while FIG. 1B illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

Methods and apparatuses to establish a relationship between an access request (e.g., RADIUS Access-Request) and an IP address request (e.g., DHCP REQUEST/DISCOVER) received by a mobile gateway (e.g., SSX) using a client device identifier information (e.g., MAC address) are described herein. Generally, the RADIUS is referred to Remote Authentication Dial In User Service networking protocol that provides centralized Authentication, Authorization, and Accounting (AAA) management for devices to connect and use a network service.

The access request is associated with an authentication communication protocol (e.g., Extensible Authentication Protocol (EAP)). EAP is an authentication framework typically used in wireless networks and point-to-point connections. The IP address request is associated with an IP communication protocol (e.g., Dynamic Host Configuration Protocol (DHCP)) which is different and independent from the authentication protocol. DHCP is known to one of ordinary skill in the art of network communications. The access request and the IP address request are two different independent asynchronous transactions that can be received by a mobile gateway in a sequence.

Determining by a mobile gateway (e.g., SSX) that these two independent transactions are related using a MAC address of the client device provides an advantage as such determination does not require any modification of the existing software residing on an access point (AP). The MAC address of the client device is included into a DHCP request message by the AP in accordance to a standard DHCP communication protocol. This MAC address is used to establish a relationship between the two independent transactions received by the mobile gateway. The AP does not need to perform additional operations, or to be modified to provide the MAC address.

Figure 9:
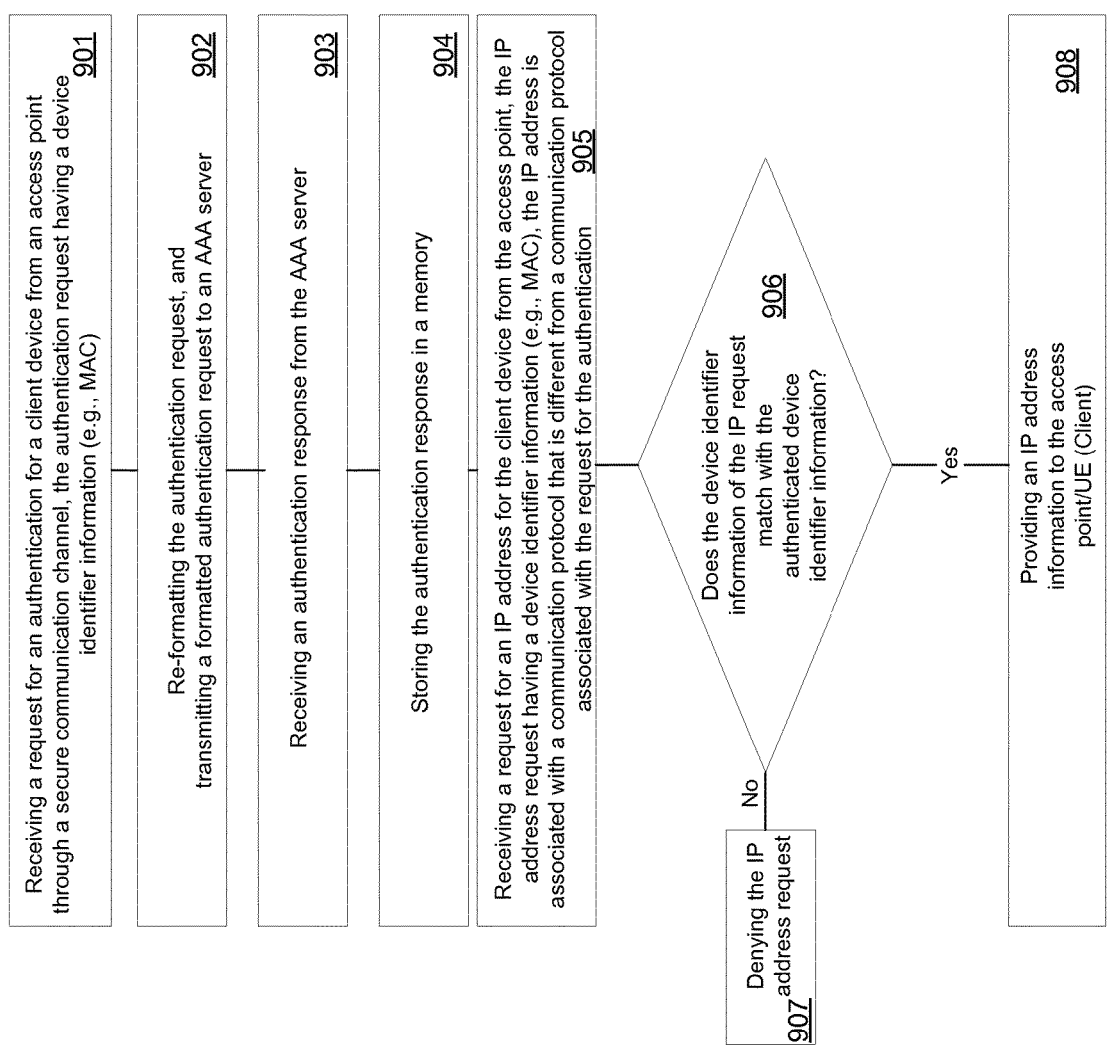
FIG. 9 is an exemplary flowchart of a method at a network element (e.g., a mobile gateway) to provide a communication between a wireless access network controlled by an AP device and a packet core network according to one embodiment.

FIG. 9 is an exemplary flowchart of a method at a network element (e.g., a mobile gateway) to provide a communication between a wireless access network controlled by an AP device and a packet core network according to one embodiment. At block 901 a request for an authentication for a client device is received from a client device via an access point through a secure communication tunnel. In one embodiment, the request for the authentication is received from the AP device through an IP secure tunnel established prior to authentication of the client device by the AP device. The secure communication tunnel, such as IPsec tunnel is described above with respect to FIGS. 1-8.

In one embodiment, the authentication request includes a device identifier information (e.g., MAC address, and other device identifier information). In one embodiment, the request for authentication is received according to an authentication communication protocol, for example, an EAP protocol, as described in further detail below. In one embodiment, the device identifier information is stored in a data structure in a memory, as shown in FIG. 13.

FIG. 13 illustrates a data structure 1300 containing a device identifier information according to one embodiment. As shown in FIG. 13, a MAC address is stored in a field 1301 of the data structure 1300.

Referring back to FIG. 9, at block 902 the request for the authentication is re-formatted and then sent by the network element to an AAA server. At block 903 an authentication response is received from the AAA server. In one embodiment, the authentication response indicates that the client device has been authenticated by the AAA server. In one embodiment, the authentication response indicates that the client device has not been authenticated by the AAA server. At block 904 the authentication response (e.g., confirmation, or non-confirmation) including the string of the MAC address of the client device is stored in a data structure in a memory.

Referring back to FIG. 13, a field 1303 of data structure 1300 indicates whether or not the MAC address of the client device has been authenticated. As shown in FIG. 13, the client device having MAC 1 has been authenticated ("Yes") by AAA server, and client device having MAC 2 has not been authenticated ("No") by AAA server.

Referring back to FIG. 9, at block 905 a request for an IP address for the client device is received from the AP device. In one embodiment, the request for the IP address is received from the AP device through an IP secure tunnel established prior to authentication of the client device by the AP device, as described above. In one embodiment, the IP address request has a client device identifier information (e.g., MAC). In one embodiment, the IP address request is received in accordance with a communication protocol that is independent from an authentication protocol of the authentication request. In one embodiment, the IP address request is received in accordance with a Dynamic Host Configuration Protocol (DHCP). At block 905 it is determined whether the device identifier information of the IP request matches with the identifier information of the client device that has been authenticated in response to the request for authentication. In one embodiment, the device identifier information (e.g., a MAC address) received with the IP request is compared with the device identifier information (e.g., a MAC address) stored in field 1302 that has indication of the authentication ("YES") in field 1303 of data structure 1300. A determination whether or not the IP address can be assigned for the client device is made based on comparing of the MAC addresses.

At block 907, the IP address request is denied, if the device identifier information (e.g., a MAC address) received with the IP request does not match with any of the device identifier information (e.g., a MAC address) stored in field 1302 that has been authenticated ("YES" in field 1303). For example, if the MAC address received with the IP request does not match to any of MAC 1 and MAC N that has been authenticated ("Yes" in field 1303), the IP address request is denied. Alternatively, for example, if the MAC address received with the IP request matches to MAC 2 that has not been authenticated ("No" in field 1303), the IP address request is denied.

At block 908 an IP address information for the client device is provided through the access point, if the device identifier information (e.g., a MAC address) received with the IP request matches to a device identifier information (e.g., a MAC address) stored in field 1302 that has been authenticated ("YES" in field 1303). For example, if the MAC address of the IP address request for a client device matches to one of MAC 2 and MAC N in field 1302 that has "Yes" in field 1303, as depicted in FIG. 13, the IP address information for that client device is assigned.

In one embodiment, determining whether or not the authentication request and the IP address request are related to the same client device involves comparing a MAC address of the IP address request to a MAC address of the authentication request stored in a memory (e.g., data structure 1300). For example, it is determined that the request for the authentication and the request for the IP address are related to the same client device, if the device identifier information of the IP request (e.g., a MAC address) matches with the device identifier information stored in field 1302, as depicted in FIG. 13.

Figure 10:
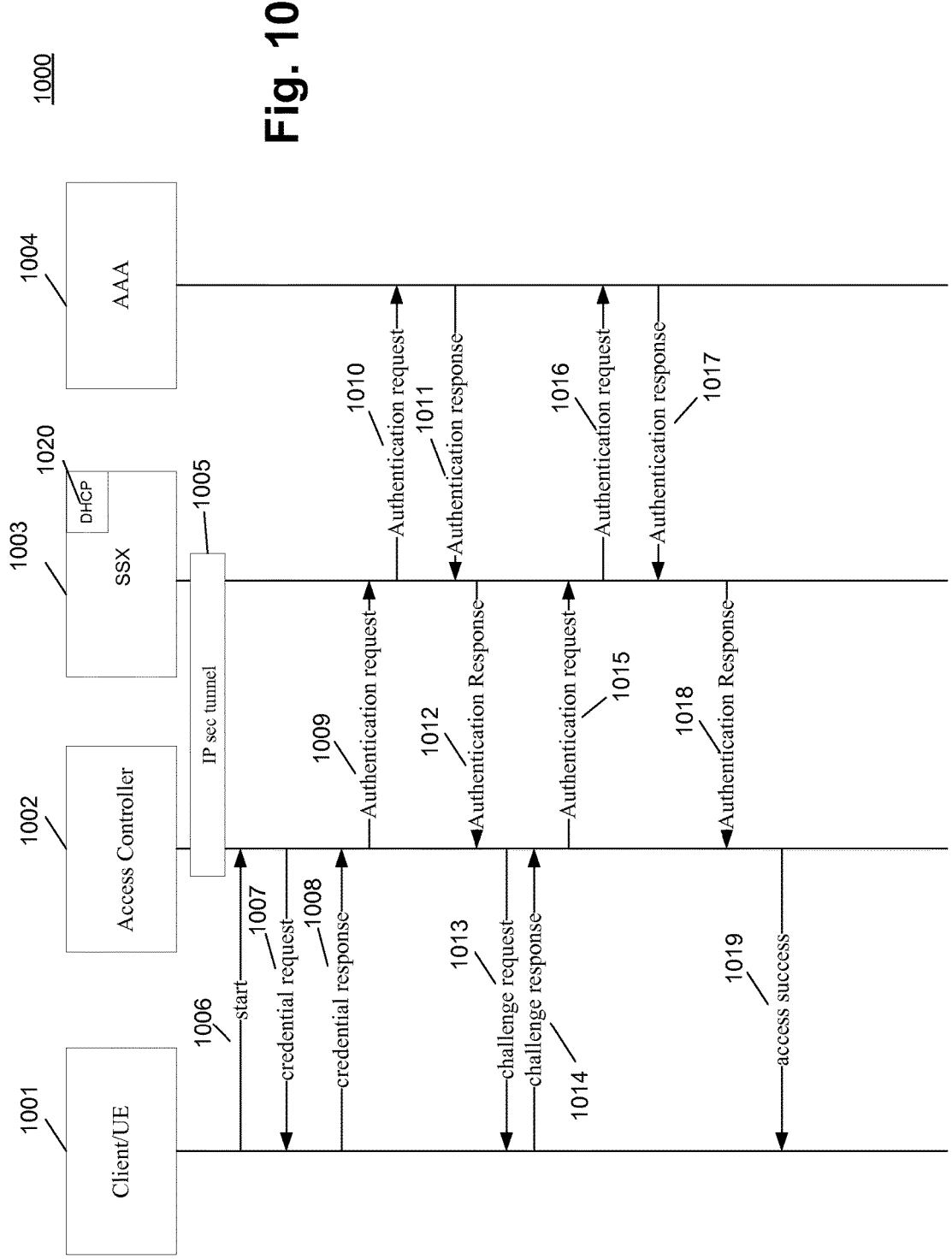
FIG. 10 is a transaction diagram illustrating a method to authenticate a client/UE device of a wireless access network controlled by an access point (AP) device to a packet core network according to one embodiment.

FIG. 10 is a transaction diagram 1000 illustrating a method to authenticate a client/UE device of a wireless access network controlled by an access point (AP) device to a packet core network according to one embodiment. In one embodiment, a WiFi access controller (AP) 1002 gets an IP access from a broadband provider, as described above. An IPsec tunnel 1005 is established between the AP 1002 and a SSX gateway device 1003, as described above with respect to FIGS. 1-9. Alternatively, a layer VPN or VPLS can be used to force traffic towards the SSX without requiring IPsec tunnel, as described above.

After a client/UE 1001 attaches to the SSID, it starts an EAPOL protocol at 1006 to gain access to a network resource. Generally, the encapsulation of EAP over IEEE 802 is defined in IEEE 802.1x and is known as "EAP over LANs" or EAPOL. In response to starting EAPOL 1006, AP 1002 sends an EAPOL request for credentials 1007 to client/UE 1001. In one embodiment, the credentials include client device identifier information (e.g., MAC address, IMSI), and other identifier information (e.g., username and password, security certificate). Client/UE 1001 sends an EAPOL response 1008 including the credentials, e.g., an identifier information of device 1001 (e.g., MAC address, IMSI, and other device identifier information) to AP 1002. AP 1002 uses an AAA protocol (e.g., RADIUS, DIAMETER) to transport an authentication request 1009 (e.g., EAP-SIM) including the identifier information (e.g., MAC address, IMSI, and other device identifier information) of client/UE 1001 through the IPsec tunnel to SSX gateway device 1003 that behaves as an AAA proxy, as described above. Generally, the DIAMETER and RADIUS is referred to an authentication, authorization and accounting protocol for computer networks In one embodiment, a RADIUS protocol in conjunction with EAP/802.1x is used to send authentication request 1009. In one embodiment, message 1009 is a RADIUS Acess-Request message that includes the EAP-Response having the identity information of the client/UE 1001. In one embodiment, message 1009 includes a WISPr message, or other authentication protocol messages. Generally, WISPr refers to a Wireless Internet Service Provider roaming protocol that allows users to roam between wireless internet service providers. In one embodiment, message 1009 includes a "Calling-Station-ID" in the radius message Access-Request to transmit the identifier information of the client/UE device 1001 (a MAC address). In one embodiment, message 1009 is a RADIUS Access-Request message having the "Calling-Station-ID AVP" field that carries the client/UE device 1001 MAC address.

After receiving the message 1009 through the IPsec tunnel, device 1003 sends an authentication request message 1010 (e.g. DIAMETER-EAP request or RADIUS Access-Request) including the credentials of the client/UE 1001 (e.g., MAC address, IMSI, and other identifier information) obtained from the client's EAP response to an AAA server 1004. In one embodiment, the device 1003 stores some information about the user (IMSI, MAC address) in a data structure, as described with respect to FIGS. 6 and 13 for later use.

The AAA server 1004 checks that the user credentials received from device 1003 are correct. In one embodiment, once the user/UE 1001 is authenticated, the AAA server 1004 checks that the user is authorized to use the network service requested. The AAA server 1004 then returns an authentication response 1011 (e.g., DIAMETER-EAP-Answer or RADIUS Access Challenge/Accept/Reject) to device 1003. In one embodiment, authentication response 1011 includes an access challenge message (e.g., EAP-request) requesting an additional credential information from user 1001. The additional credential information can be, e.g., a secondary password, a PIN, a token, a card, and other credential information.

Device 1003 sends an RADIUS authentication response message 1012 (e.g., EAP-Request) to AP 1002. AP 1002 sends an EAPOL message (EAP challenge request) 1013 (e.g., EAPOL) for the additional credential information to client/UE 1001. In response, client/UE 1001 sends an EAPOL message (EAP challenge response) 1014 that includes the required additional credential information to AP 1002. As shown in FIG. 10, AP 1002 sends an authentication request 1015 (e.g., RADIUS access request) to device 1003. The authentication request 1015 includes the required additional credential information of the EAP response of the client/UE 1001. Device 1003 then sends an authentication request message 1016 (e.g., DIAMETER-EAP-Request or RADIUS Access Challenge/Accept/Reject) to AAA server 1004. The authentication request 1016 includes the required additional credential information of the EAP response of the client/UE 1001. After validating the required additional credential information of the client/UE 1001, AAA server 1004 sends an authentication response message 1017 to device 1003 indicating that the user is granted access to a network resource.

After receiving AAA response 1017 from AAA server 1004, SSX device 1003 sends a RADIUS authentication response message 1018 (EAP-success) back to the AP 1002. At this point client/UE 1001 has been successfully authenticated and authorized by the service providers AAA server 1004. In one embodiment, gateway device 1003 includes a built-in DHCP capability 1212, as shown in FIG. 10.

Figure 11:
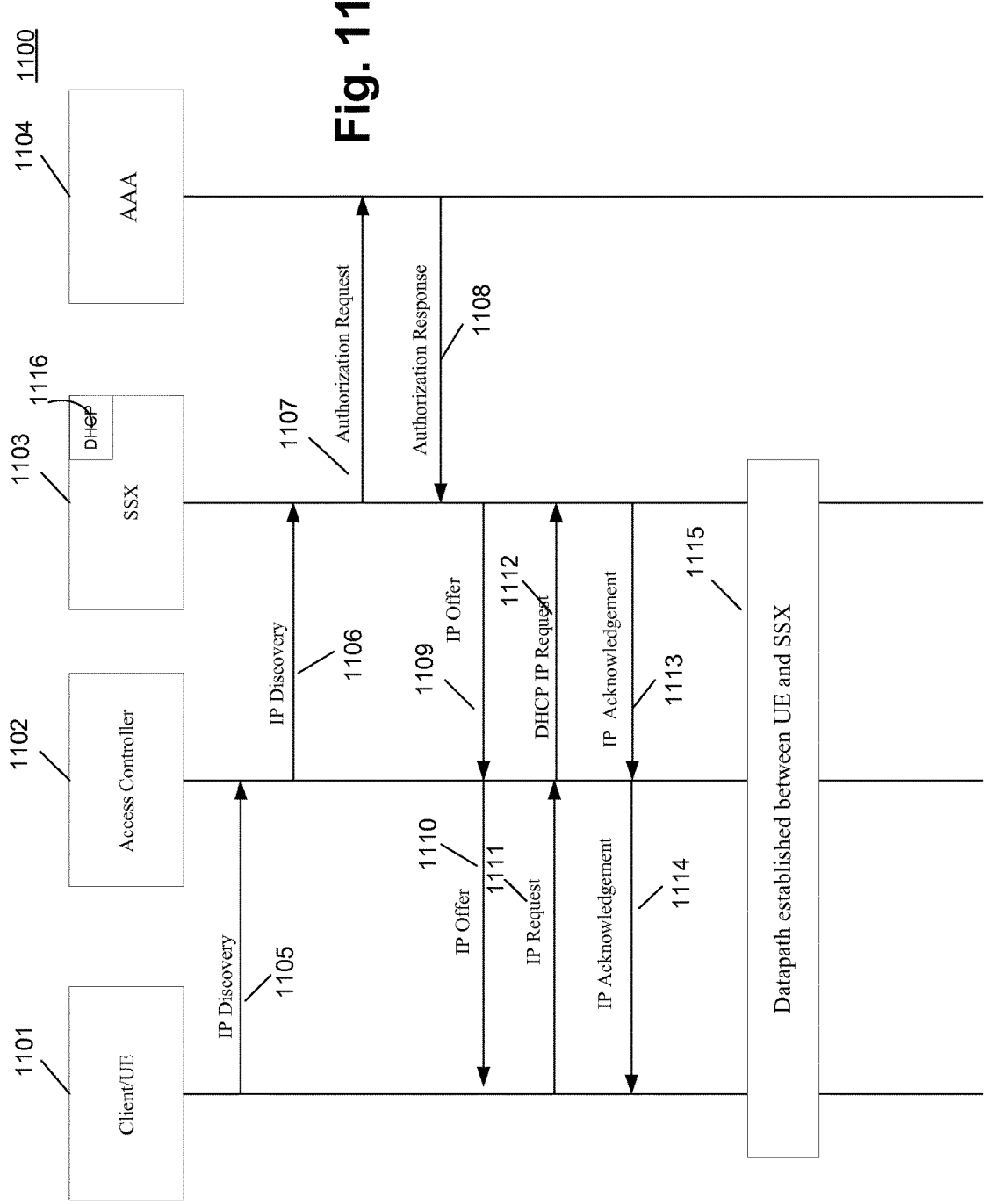
FIG. 11 is a transaction diagram illustrating a method to allocate an IP address for a client/UE device of a wireless access network controlled by an access point (AP) device to access a packet core network using an IP discovery mechanism according to one embodiment.

FIG. 11 is a transaction diagram 1100 illustrating a method to allocate an IP address for a client/UE device of a wireless access network controlled by an access point (AP) device to access a packet core network using an IP discovery mechanism according to one embodiment. As shown in FIG. 11, a client/UE 1101 starts an IP discovery 1105 to get an IP address provisioned, as described above with respect to FIGS. 1-8. Generally, the IP discovery refers to sending messages on the physical subnet to discover available DHCP servers.

As shown in FIG. 11, a SSX gateway device 1103 includes a DHCP server capability 1116. In one embodiment, an access controller (AP) device 1102 relays an IP discovery message 1106 to a gateway device 1103 via an IP secure tunnel. The IP sec tunnel is described above with respect to FIGS. 1-10. In one embodiment, DHCP discover message 1106 includes a MAC address of the client/device 1101. Generally, the MAC address refers to a unique identifier assigned to a network interface for communications on the physical network segment (client hardware address). In one embodiment, gateway device 1103 stores the MAC address of the client/UE 1101 in a data structure, as shown in FIGS. 6 and 13.

In one embodiment, the IPsec tunnel is established to send IP discovery message 1106 between the AP 1102 and a SSX gateway device 1103, as described above with respect to FIGS. 1-9. In one embodiment, a layer VPN or VPLS can be used to force traffic, including IP Discovery message 1106 towards the SSX without requiring IPsec tunnel, as described above.

AP 1102 behaves as a DHCP relay agent to relay the IP Discovery message 1106 including UE identity (e.g., MAC address, IMSI) to SSX device 1103. In one embodiment, IP discovery message 1106 is a DHCP Discover message having a "chaddr" field and other provisioned fields required to create a subscriber session. In one embodiment, the identity (e.g., MAC address) of the client/UE 1101 is included into the "chaddr" field of the DHCP Discover message to send to gateway device 1103. As shown in FIG. 11, gateway device 1103 receives IP discovery message 1106 (e.g., DHCP discover) having the identifier information (e.g., MAC address) of the client device.

In one embodiment, gateway device 1103 receives the IP discovery message 1106 that includes a MAC address of the client/UE 1101 and determines whether or not the received MAC address has been authenticated during an authentication process, such as the authentication process described in FIGS. 9 and 10. In one embodiment, gateway 1103 determines whether the MAC address of the IP discovery message (e.g., message 1106) and the MAC address of the authentication-request message (e.g., message 1009 in FIG. 10) are related to the same client device. In one embodiment, gateway 1103 compares the received MAC address of the IP Discovery message 1106 with the MAC addresses stored in a data structure, such as data structure 1300 to provide such determination. If the gateway 1103 determines that the MAC address of the IP discovery message and the MAC address (data structure field 1301) of the authentication-request message (e.g. message 1009 in FIG. 10) are related to the same client device, the gateway device 1103 transmits an authorization request 1107 to an AAA server 1104. In one embodiment, authorization request 1107 is transmitted based on the IP discovery message 1106. In one embodiment, authorization request 1107 includes an identifier information of the client 1101 (e.g., W-APN-ID). In one embodiment, APN-ID refers to an Access Point Name which is a configurable network identifier used by a mobile device when connecting to a mobile operator. In one embodiment, the Access Point Name (APN) identifies an IP Packet Data Network (PDN) with which a mobile data user wants to communicate. In one embodiment, AAA server 1104 validates the information provided with the authorization request 1107, and if the identifier information is valid, AAA server 1104 sends an authorization response message 1108 to gateway device 1103 authorizing the user/client 1101 to get an IP address.

In one embodiment, in response to receiving the authorization from the AAA server 1104, gateway device 1103 reserves an IP address for the client and sends an IP lease offer message 1109 that includes the assigned IP address to AP 1102. In another embodiment, gateway 1103 transmits a session request to the packet core network based on the identifier information of the client/UE 1101, and then receives a session response from the packet core network that includes the IP address allocated by the packet core network. In one embodiment, the session response including the allocated IP address is transmitted from GGSN, such as GGSN 811 depicted in FIG. 8. In one embodiment, a GTP-U tunnel is setup between SSX device 1103 and the P-GW/GGSN, as described above. UE 1101 uses the P-GW/GGSN assigned IP address as the source for its data packets.

In one embodiment, IP offer message 1109 is a DHCP OFFER message that includes the IP address for client/UE 1101. In one embodiment, message 1112 contains the client's MAC address, the IP address that the server is offering, the subnet mask, the lease duration, and the IP address of the DHCP server making the offer, and other information required to establish the session. AP device 1102 forwards the IP offer message 1110 to client/UE 1101.

In response to the IP offer message 1110, the client/UE 1101 replies with an IP request message 1111 (e.g., DHCP Request) to AP 1102, requesting the offered IP address. In one embodiment, client/UE 1101 receives DHCP offers from multiple servers, but accepts only one DHCP offer. AP 1102 forwards the IP request 1112 to gateway device 1103. When the gateway 1103 receives the IP message 1112 (DHCP REQUEST), the gateway 1103 sends an IP address acknowledgement message 1113 (DHCP Ack) to AP 1102. AP 1102 forwards the IP address acknowledgement message 1114 to client/UE 1101. The acknowledgement message 1114 can include the lease duration and any other configuration information that the client have requested. At this point, the IP configuration process is completed, and a datapath is established between client/UE 1101 and gateway 1103. In one embodiment, after the datapath is established, AP/Controller 1102 forwards data packets from the client/UE 1101 through the IPsec tunnel towards the SSX device 1103 (ePDG/TTG). In one embodiment, SSX device 1103 forwards these data packets through the GTP-U and through the P-GW/GGSN towards a service provider network, as described with respect to FIG. 8. In one embodiment, SSX device 1103 (PDG) forwards these data packets (IP) to/from the Internet, for example through a path 117, as depicted in FIG. 1A.

Figure 12:
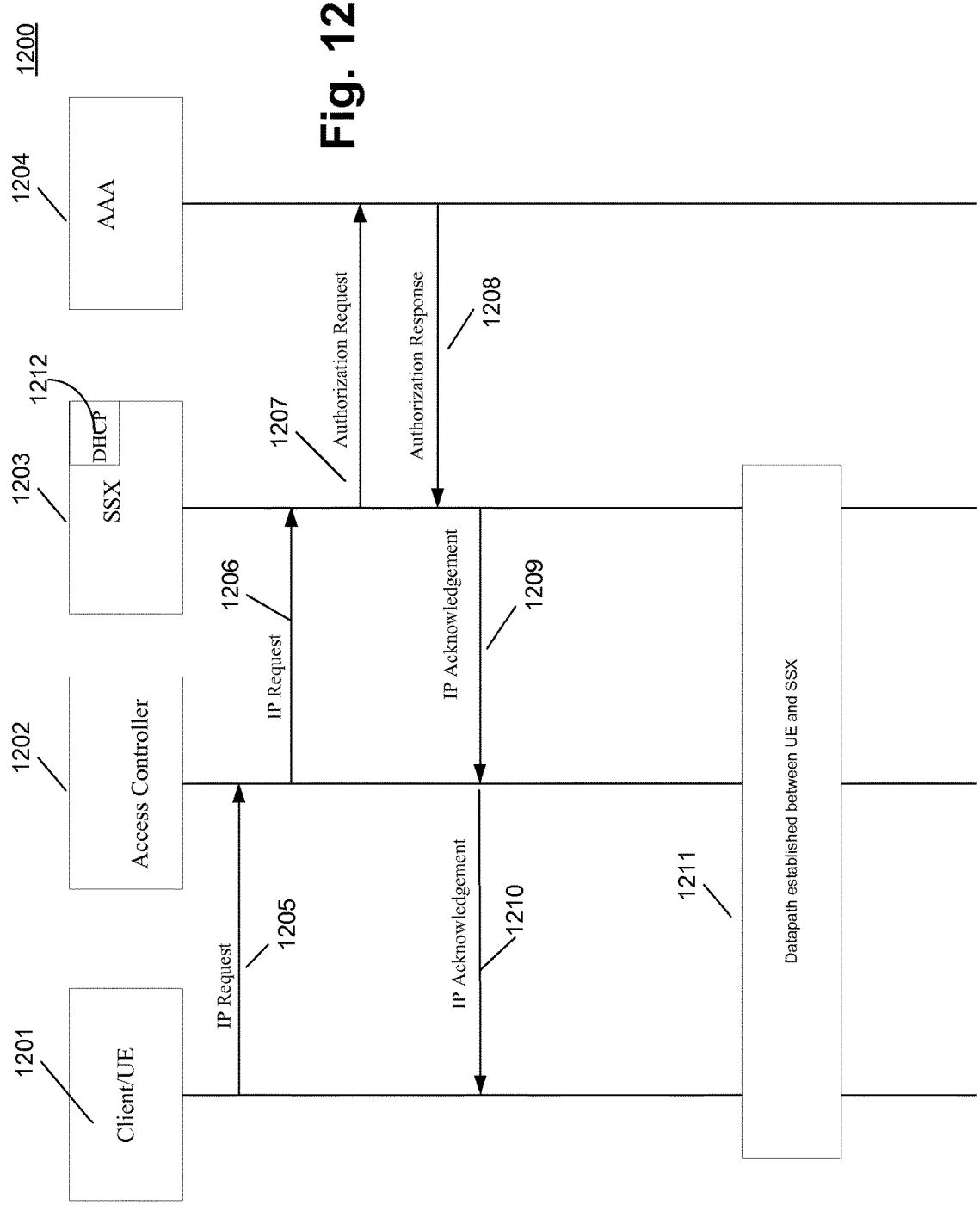
FIG. 12 is a transaction diagram illustrating a method to allocate an IP address for a client/UE device of a wireless access network controlled by an access point (AP) device to access a packet core network using an IP request mechanism according to one embodiment.

FIG. 12 is a transaction diagram 1200 illustrating a method to allocate an IP address for a client/UE device of a wireless access network controlled by an access point (AP) device to access a packet core network using an IP request mechanism according to one embodiment. As shown in FIG. 12, a client/UE 1201 sends an IP request message 1205 to an access controller device (AP) 1202 to get an IP address provisioned.

As shown in FIG. 12, a SSX gateway device 1203 includes a DHCP server capability 1212. In one embodiment, AP device 1202 relays an IP request message 1206 to a SSX gateway device 1203 via an IP secure tunnel. The IP sec tunnel is described above with respect to FIGS. 1-11. In one embodiment the IP request message 1206 is a DHCP discover message having a MAC address of the client/UE 1201. In one embodiment, gateway device 1203 stores the MAC address of the client/UE 1201 in a data structure, as shown in FIGS. 6 and 13.

In one embodiment, the IPsec tunnel is established to send IP request message 1206 from the AP 1102 to SSX gateway device 1203, as described above. In one embodiment, a layer VPN or VPLS can be used to force traffic, including IP request message 1206 towards the SSX without requiring IPsec tunnel, as described above.

In one embodiment, IP request message 1206 is a DHCP Request message having a "chaddr" field and other provisioned fields required to create a session. In one embodiment, the identity (e.g., MAC address) of the client/UE 1201 is included into the "chaddr" field of the DHCP Request message to send to gateway device 1203. As shown in FIG. 12, gateway device 1203 receives IP request message 1206 (e.g., DHCP Request) having the identifier information (e.g., MAC address) of the client device 1201.

In one embodiment, gateway device 1203 receives the IP request message 1206 that includes a MAC address of the client/UE 1201 and determines whether or not the received MAC address has been authenticated during an authentication process, such as the authentication process described in FIGS. 9 and 10. In one embodiment, gateway 1203 determines whether the MAC address of the IP request message (e.g., message 1206) and the MAC address of the authentication request message (e.g., message 1009 in FIG. 10) are related to the same client device. In one embodiment, gateway 1203 compares the received MAC address of the IP Request message 1206 with the MAC addresses stored in a data structure, such as data structure 1300 to provide such determination. If the gateway 1203 determines that the MAC address of the IP request message and the MAC address of the authentication request message are related to the same client device, gateway device 1203 transmits an authorization request 1207 to an AAA server 1204. In one embodiment, authorization request 1207 is transmitted based on the IP request message 1206. In one embodiment, authorization request 1207 includes an identifier information of the client 1201 (e.g., W-APN-ID). In one embodiment, AAA server 1204 validates the information provided with the authorization request 1207, and if the identifier information is valid, AAA server 1204 sends an authorization response message 1208 to gateway device 1203 authorizing the user/client 1201 to get an IP address.

In one embodiment, in response to receiving the authorization from the AAA server 1204, gateway device 1203 reserves an IP address for the client/UE 1201. In one embodiment, gateway device 1203 transmits a session request to the packet core network based on the identifier information of the client/UE 1201 (e.g., a MAC address), and then receives a session response from the packet core network that includes the IP address allocated by the packet core network. In one embodiment, gateway 1203 allocates an IP address from its local IP address pool to client/UE 1201.

In one embodiment, a GTP-U tunnel is setup between SSX device 1203 and the P-GW/GGSN, as described above. In one embodiment, SSX device 1203 acts as a PDG device and directly communicates with Internet, for example, through a path 117, as depicted in FIG. 1A. UE 1201 uses the P-GW/GGSN assigned IP address as the source for its data packets. In one embodiment, when the gateway 1203 receives the authorization response message 1208 from AAA server 1204, the gateway 1203 sends an IP address acknowledgement message 1209 (DHCP Ack) to AP 1202. AP 1202 forwards the IP address acknowledgement message 1210 to client/UE 1201. The acknowledgement message 1210 can include the lease duration and any other configuration information that the client have requested. At this point, the IP configuration process is completed, and a datapath 1211 is established between client/UE 1201 and gateway 1203, as described above.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense. In addition, embodiments of the present invention are not described with reference to any particular programming language. It will be appreciated that a variety of programming languages may be used to implement the teachings of embodiments of the invention as described herein.

What is claimed is:

1. A machine-implemented method at a network element to provide a communication between a wireless access network controlled by an access point (AP) device and a packet core network, comprising:

providing a mobility gateway device between the AP device and the packet core network and between a radio network controller of a radio access network and the packet core network;

coupling a client device to a radio access network controller of a radio access network, wherein the radio access network controller is communicably coupled to the mobility gateway device;

establishing an IP secure tunnel between the AP device and a mobility gateway device, coupling the AP device with a packet core network, wherein the AP device is communicably coupled to the client device in the wireless network and wherein the mobility gateway device is further communicably coupled to a mobile network gateway of the wireless network;

receiving a request for an authentication for the client device from the AP device, the request for the authentication having a first identifier information, wherein the request for an authentication is associated with an authentication protocol;

receiving a request for an IP address for the client device having a second identifier information from the AP device, wherein the request for the IP address is associated with a first communication protocol and the second identifier is associated with the second communication protocol;

authenticating, by a mobile network operator's authentication process, the client device through the IP secure tunnel between the mobility gateway device and the AP device, while the client device is roaming in the wireless network;

mapping the first identifier information and the second identifier information using the mobility gateway device;

providing the first identifier information and the second identifier information through the secure tunnel;

comparing the first identifier information to the second identifier information for the client device, wherein the authentication protocol is different from the first communication protocol and the first identifier information is received as part of the authentication request associated with the authentication protocol different from the IP address request associated with the first communication protocol; and determining whether to provide the IP address from the mobility gateway device for the client device through an access point based on the step of comparing;

providing the IP address through the IP secure tunnel to the client device if the first identifier information and the second identifier information are related;

communicating the IP address from the mobility gateway device to the packet core network and to a controller of the wireless access network controlled by AP device; and maintaining a communication session with a remote entity using the IP address while the client device roams between the wireless access network controlled by an access point and the packet core network, wherein the mobility of the client device is managed by the mobility gateway device, and wherein the mobility gateway device determines whether the client device is attempting to establish a connection with the Internet or operator services of the mobile network operator.

2. The method of claim 1, wherein each of the first identifier information and the second identifier information includes a Media Access Control (MAC) address.

3. The method of claim 1, further comprising:
formatting the request for the authentication;
transmitting the formatted request for the authentication to an authentication, authorization, and accounting (AAA) server; and
receiving an authentication response for the first identifier information from the AAA server, storing the authentication response in a memory.

4. The method of claim 1, further comprising:
determining that the request for the authentication and the request for the IP address are related if the first identifier information matches with the second identifier information.

5. The method of claim 1, further comprising:
transmitting a challenge request for an additional credential information for the client device; and
receiving the challenge response including the additional credential information.

6. The method of claim 1, wherein the first communication protocol includes a Dynamic Host Configuration Protocol (DHCP).

7. The method of claim 1, further comprising:
receiving an IP discovery message for the client device;
transmitting an authorization request based on the IP discover message to an AAA server; and
receiving an authorization response for the client device from the AAA server.

8. The method of claim 1, wherein the authentication protocol includes an Extensible Authentication Protocol.

9. The method of claim 1, further comprising:
transmitting a session request to the packet core network based on the first identifier information;
receiving a session response from the packet core network, the session response including the IP address allocated by the packet core network; and
assigning the IP address to the client device.

10. A non-transitory machine-readable storage medium storing instructions therein, which when executed by a data processing system, cause the data processing system to perform operations comprising:

coupling a client device to a radio access network controller of a radio access network, wherein the radio access network controller is communicably coupled to a mobility gateway device;

establishing an IP secure tunnel between the AP and a mobility gateway device, wherein the mobility gateway device is further communicably coupled to a mobile network gateway of the packet core network;

receiving a request for an authentication for the client device from the AP device, the request for the authentication having a first identifier information, wherein the request for an authentication is associated with an authentication protocol;

receiving a request for an IP address for the client device having a second identifier information from the AP device, wherein the request for the IP address is associated with a first communication protocol and the second identifier is associated with the second communication protocol;

authenticating, by a mobile network operator's authentication process, the client device through the IP secure tunnel between the mobility gateway device and the AP device, while the client device is roaming in the wireless network;

mapping the first identifier information and the second identifier information using the mobility gateway device;

providing the first identifier information and the second identifier information through the secure tunnel;

comparing the first identifier information to the second identifier information for the client device, wherein the authentication protocol is different from the first communication protocol and the first identifier is received as part of the authentication request associated with the authentication protocol different from the IP address request associated with the first communication protocol;

determining whether to provide the IP address from the mobility gateway device for the client device through an access point based on the step of comparing;

providing the IP address through the IP secure tunnel to the client device if the first identifier information and the second identifier information are related; and communicating the IP address from the mobility gateway device to the packet core network and to a controller of the wireless access network controlled by an access point device to allow the client device to roam between a wireless access network controlled by an AP device and a packet core network; and maintaining a communication session with a remote entity using the IP address while the client device roams between the wireless access network controlled by an access point and the packet core network, wherein the mobility of the client device is managed by the mobility gateway device; and wherein the mobility gateway device determines whether the client device is attempting to establish a connection with the Internet or operator services of the mobile network operator.

11. The non-transitory machine-readable storage medium of claim 10, wherein each of the first identifier information and the second identifier information includes a Media Access Control (MAC) address.

12. The non-transitory machine-readable storage medium of claim 10, further comprising instructions which when executed by the data processing system cause the system to perform operations comprising:

formatting the request for the authentication;

transmitting the formatted request for the authentication to an authentication, authorization, and accounting (AAA) server; receiving an authentication response for the first identifier information from the AAA server; and storing the authentication response in a memory.

13. The non-transitory machine-readable storage medium of claim 10, further comprising instructions which when executed by the data processing system cause the system to perform operations comprising:

determining that the request for the authentication and the request for the IP address are related if the first identifier information matches with the second identifier information.

14. The non-transitory machine-readable storage medium of claim 10, further comprising instructions which when executed by the data processing system cause the system to perform operations comprising:

transmitting a challenge request for an additional credential information for the client device; and receiving the challenge response including the additional credential information.

15. The non-transitory machine-readable storage medium of claim 10, wherein the first communication protocol includes a Dynamic Host Configuration Protocol (DHCP).

16. The non-transitory machine-readable storage medium of claim 13, further comprising instructions which when executed by the data processing system cause the system to perform operations comprising:

receiving an IP discovery message for the client device;

transmitting an authorization request based on the IP discover message to an AAA server; and receiving an authorization response for the client device from the AAA server.

17. The non-transitory machine-readable storage medium of claim 10, wherein the authentication protocol includes an Extensible Authentication Protocol.

18. The non-transitory machine-readable storage medium of claim 10, further comprising instructions which when executed by the data processing system cause the system to perform operations comprising:

transmitting a session request to the packet core network based on the first identifier information;

receiving a session response from the packet core network, the session response including the IP address allocated by the packet core network; and assigning the IP address to the client device.

19. A network element, comprising:

a processor; and a memory coupled to the processor for storing instructions, which when executed from the memory, causes the processor to:

couple a client device to a radio access network controller of a radio access network, wherein the radio access network controller is communicably coupled to a mobility gateway device;

establish an IP secure tunnel between an access point (AP) and the mobility gateway device, wherein the mobility gateway device is further communicably coupled to a mobile network gateway of the wireless network;

receive a request for an authentication for a client device from the AP device, the request for the authentication having a first identifier information, wherein the request for an authentication is associated with an authentication protocol;

receive a request for an IP address for the client device having a second identifier information from the AP device, wherein the request for the IP address is associated with a first communication protocol and the second identifier is associated with the second communication protocol;

authenticate, by a mobile network operator's authentication process, the client device through the IP secure tunnel between mobility gateway device and the AP device, while the client device is roaming in the wireless network;

mapping the first identifier information and the second identifier information using the mobility gateway device;

providing the first identifier information and the second identifier information through the secure tunnel;

compare the first identifier information to a second identifier information for the client device, wherein the authentication protocol is different from the first communication protocol and the first identifier is received as part of the authentication request associated with the authentication protocol different from the IP address request associated with the first communication protocol; and determine whether to provide the IP address from a mobility gateway device for the client device through an access point based on the step of comparing;

provide the IP address through the IP secure tunnel to the client device if the first identifier information and the second identifier information are related; and communicate the IP address from the mobility gateway device to the packet core network and to a controller of the wireless access network controlled by an access point device to allow the client device to roam between the wireless access network controlled by AP point device and the packet core network; and maintaining a communication session with a remote entity using the IP address while the client device roams between the wireless access network controlled by an access point and the packet core network, and wherein the mobility of the client device is managed by the mobility gateway device, and wherein the mobility gateway device determines whether the client device is attempting to establish a connection with the Internet or operator services of the mobile network operator.

20. The network element of claim 19, wherein each of the first identifier information and the second identifier information includes a Media Access Control (MAC) address.

21. The network element of claim 19, wherein the processor is for storing further instructions, which when executed from the memory, cause the processor to format the request for the authentication; to send the formatted request for the authentication to an authentication, authorization, and accounting (AAA) server; to receive an authentication response for the first identifier information from the AAA server, and to store the authentication response in a memory.

22. The network element of claim 19, wherein the processor is for storing further instructions, which when executed from the memory, cause the processor to determine that the request for the authentication and the request for the IP address are related if the first identifier information matches with the second identifier information.

23. The network element of claim 19, wherein the processor is for storing further instructions, which when executed from the memory, cause the processor to send a challenge request for an additional credential information for the client device; and to receive the challenge response including the additional credential information.

24. The network element of claim 19, wherein the first communication protocol includes a Dynamic Host Configuration Protocol (DHCP).

25. The network element of claim 19, wherein the processor is for storing further instructions, which when executed from the memory, cause the processor to receive an IP discovery message for the client device; to send an authorization request based on the IP discover message to an AAA server; and to receive an authorization response for the client device from the AAA server.

26. The network element of claim 19, wherein the authentication protocol includes an Extensible Authentication Protocol.

27. The network element of claim 19, wherein the processor is for storing further instructions, which when executed from the memory, cause the processor to send a session request to the packet core network based on the first identifier information; to receive a session response from the packet core network, the session response including the IP address allocated by the packet core network; and to assign the IP address to the client device.

28. The method of claim 1, wherein the communication between the AP and the packet core network becomes secure without running an IP secure protocol on the client device.

29. The method of claim 10, wherein the communication between the AP and the packet core network becomes secure without running an IP secure protocol on the client device.

30. The method of claim 19, wherein the communication between the AP and the packet core network becomes secure without running an IP secure protocol on the client device.

* * * * *